US012152155B2

(12) United States Patent
Deighton et al.

(10) Patent No.: US 12,152,155 B2
(45) Date of Patent: Nov. 26, 2024

(54) DIRECT FOOD CONTACT INKS

(71) Applicant: SUN CHEMICAL CORPORATION, Parsippany, NJ (US)

(72) Inventors: Robert Deighton, Rochdale (GB); Stewart Carson, Rochdale (GB); Simon Wild, Rochdale (GB); Michael Simoni, Rochdale (GB)

(73) Assignee: Sun Chemical Corporation, Parsippany, NJ (US)

( * ) Notice: Subject to any disclaimer, the term of this patent is extended or adjusted under 35 U.S.C. 154(b) by 313 days.

(21) Appl. No.: 17/625,056

(22) PCT Filed: Jul. 9, 2020

(86) PCT No.: PCT/US2020/041392
§ 371 (c)(1),
(2) Date: Jan. 5, 2022

(87) PCT Pub. No.: WO2021/007422
PCT Pub. Date: Jan. 14, 2021

(65) Prior Publication Data
US 2022/0282101 A1 Sep. 8, 2022

Related U.S. Application Data

(60) Provisional application No. 62/872,879, filed on Jul. 11, 2019.

(51) Int. Cl.
*C09D 11/037* (2014.01)
*C09D 11/023* (2014.01)
(Continued)

(52) U.S. Cl.
CPC .......... *C09D 11/037* (2013.01); *C09D 11/023* (2013.01); *C09D 11/107* (2013.01);
(Continued)

(58) Field of Classification Search
CPC ... C09D 11/037; C09D 11/023; C09D 11/107; C09D 11/12; C09D 11/322;
(Continued)

(56) References Cited

U.S. PATENT DOCUMENTS 4,168,662 A 9/1979 Fell
5,397,387 A 3/1995 Deng
(Continued)

FOREIGN PATENT DOCUMENTS

CA 2 678 467 A1 9/2008
CN 104271683 A 1/2015
(Continued)

OTHER PUBLICATIONS

Japanese Office Action issued in counterpart JP Application No. 2022-500964, mailed Jan. 15, 2024 with English language translation of relevant parts.
(Continued)

*Primary Examiner* — James C Yager
(74) *Attorney, Agent, or Firm* — Marian E. Fundytus; Ostrolenk Faber LLP.

(57) ABSTRACT

Described herein are printing inks that are safe for direct contact with food. The inks contain colorants and other substances which comply with regulations governing the amounts of substances determined to be safe in the event one or more of the ink-containing substances were to migrate into foods or beverages, The inks exhibit resistance to removal. Also described are sets of inks. The inks provide wide color gamut.

19 Claims, 3 Drawing Sheets

(51) Int. Cl.
*C09D 11/107* (2014.01)
*C09D 11/12* (2006.01)
*C09D 11/322* (2014.01)
*C09D 11/324* (2014.01)
*C09D 11/328* (2014.01)
*C09D 11/40* (2014.01)
*D21H 19/38* (2006.01)
*D21H 19/42* (2006.01)
*D21H 19/60* (2006.01)

(52) U.S. Cl.
CPC ............ *C09D 11/12* (2013.01); *C09D 11/322* (2013.01); *C09D 11/324* (2013.01); *C09D 11/328* (2013.01); *C09D 11/40* (2013.01); *D21H 19/385* (2013.01); *D21H 19/42* (2013.01); *D21H 19/60* (2013.01)

(58) Field of Classification Search
CPC ..... C09D 11/324; C09D 11/328; C09D 11/40; C09D 11/02; D21H 19/385; D21H 19/42; D21H 19/60
See application file for complete search history.

(56) References Cited

U.S. PATENT DOCUMENTS

| | | | |
|---|---|---|---|
| 5,637,139 A | 6/1997 | Morelos | |
| 5,722,219 A * | 3/1998 | Dobransky | A47G 21/182 283/79 |
| 2014/0285568 A1* | 9/2014 | Loccufier | C09D 11/322 522/18 |
| 2021/0163778 A1* | 6/2021 | Singer | C08F 2/22 |

FOREIGN PATENT DOCUMENTS

| | | |
|---|---|---|
| CN | 105518085 A | 4/2016 |
| CN | 105 860 668 A | 8/2016 |
| CN | 108 410 254 A | 8/2018 |
| CN | 109 370 298 A | 2/2019 |
| EP | 0 705 890 A1 | 4/1996 |
| EP | 2 133 210 A2 | 12/2009 |
| EP | 3 257 905 A1 | 12/2017 |
| EP | 3 409 731 A1 | 12/2018 |
| JP | H08-113746 | 5/1996 |
| JP | 2011-026404 | 2/2011 |
| JP | 2016-530354 | 9/2016 |
| JP | 2020-517783 | 6/2020 |
| WO | WO 97/35933 A1 | 10/1997 |
| WO | WO 2019/117231 | 6/2019 |

OTHER PUBLICATIONS

International Search Report issued in International Application No. PCT/US2020/41392, mailed Nov. 9, 2020.
Written Opinion of the International Searching Authority issued in International Application No. PCT/US2020/41392, mailed Nov. 9, 2020.
$2^{nd}$ Written Opinion of the International Searching Authority issued in International Application No. PCT/US2020/41392, mailed Jul. 12, 2021.
International Preliminary Report on Patentability (Chapter 1 of the Patent Cooperation Treaty) issued in International Application No. PCT/US2020/41392, mailed Nov. 16, 2021.
Outcome of the public consultation on the draft guidance on the use of the Threshold of Toxicological Concern approach in food safety assessment, May 17, 2019 (May 17, 2019).
Guidance on the use of the Threshold of Toxicological Concern approach in food safety assessment, Apr. 24, 2019 (Apr. 24, 2019).
Priority topics for the development of risk assessment guidance by EFSA's Scientific Committee in 2016-2018, May 19, 2016 (May 19, 2016).
Review of the Threshold of Toxicological Concern (TTC) approach and development of new TTC decision tree, Mar. 10, 2016 (Mar. 10, 2016).
"Scientific Opinion on Exploring options for providing advice about possible human health risks based on the concept of Threshold of Toxicological Concern (TTC", EFSA Journal, vol. 10, No. 7, 2012, p. 2750.
Eu PIA Guidance for Risk Assessment of Non-Intentionally Added Substances (NIAS) and Non-Evaluated or Non-Listed Substances (NLS) in printing inks for food contact materials.
Indonesian Office Action issued in counterpart ID Application No. P00202200923, mailed Jul. 25, 2023 with machine English language translation.
Chinese Office Action issued in counterpart CN Application No. 202080049828.X, mailed Jun. 1, 2023 with English language translation.
Chinese Office Action issued in counterpart CN Application No. 202080049828.X, mailed Oct. 25, 2023 with English language translation of relevant parts.
Chinese Office Action issued in counterpart CN Application No. 202080049828.X, mailed Oct. 10, 2022 with English language translation of relevant parts.

* cited by examiner

DIRECT FOOD CONTACT INKS

CROSS REFERENCE TO RELATED APPLICATIONS

The present application is a § 371 National Phase application based on PCT/US2020/041392 filed Jul. 9, 2020, which claims the benefit of U.S. Provisional Application No. 62/872,879, filed Jul. 11, 2019 the subject matter of each of which is incorporated by reference in their entirety.

BACKGROUND OF THE INVENTION

Paper and other materials such as paperboard, plastics, etc. are used for food packaging. Often these materials directly contact the packaged food, such as to wrap and contain them through the stream of commerce and ultimate attainment by the end use consumer. Another direct food contact (DFC) application is paper drinking straws. Paper straws have existed for many years, and while they have generally been superseded by plastic drinking straws, the paper straw is making a comeback due to the many problems caused by plastic waste, such as environmental problems. For example, as a general matter, paper will degrade whereas many plastics will not.

Health and safety regulations governing direct food contact applications have changed since paper straws were initially in favor. Presently, many straws are printed with inks including non-direct food contact pigments in order to get bright color. This may be because pigments approved for food contact based on iron oxide give duller colors that are less bright and thus less satisfactory in appearance. Brighter, vibrant colors cannot be produced from such pigments.

In the United States, 21 CFR § 178.3297 regulates colorants for polymers. This section sets forth limits for the amounts of the listed colorants and other substances. However the list in this section appears to be old, and it does not necessarily account for other substances that are present in the colorant (these substances are referred to as non-intentionally added substances (NIAS)). Further, it lists mainly inorganic pigments, which suffer the disadvantage of providing only limited color gamut.

European regulations lists approved food colorants, and there are inks for direct food contact that utilize those colorants. However, a September 2016 study by the European Food Safety Authority (EFSA) indicated that an approved food colorant per se is not sufficient to guarantee the safety of same for direct contact with food. Also, these food colorants provide only a limited color gamut, and often do not possess sufficient resistance properties, such as wet and dry rub resistance, as well as not providing sufficient lightfastness and chemical resistance.

The three primary food contact material (FCM) regulatory systems, that is, the U.S. the European Union, and China, have the same aim, which is to prevent substances migrating into food at levels which could endanger human health. There is some variation in how this is phrased, with for example, the FDA regulations referring to unintentional food additives, but the aim is the same.

In Europe, the safety of food contact materials is controlled by the Framework Regulation (EC) No 1935/2004. Article 5 of this regulation includes a provision for regulating concerning specific food contact materials. One such regulation for specific food contact materials is Plastics Regulation (EU) No 10/20011. The Plastics Regulation contains a positive list of substances with Specific Migration Limits. Link to regulation: https://eur-lex.europa.eu/legal-content/EN/TXT/?qid=1592209990405&uri=CELEX: 32011R0010.

In Switzerland, the Swiss Federal Department of Home Affairs (FDHA) have adopted an amendment to the Ordinance of 23 Nov. 2005 on Materials and Articles provisions relating to packaging inks (SR 817.023.21). The requirement is that only permitted substances should be used in the manufacture of Packaging Inks. Permitted Substances are defined as those which are listed in Annex 2, Lists I and II, and in Annex 10. The substances listed in Annex 2 reference those listed in the Plastics Regulation (EU) No 10/20011. The substances listed in Annex 10 are split into list A and list B. Substances listed with List A status either have a quoted specific migration limit (SML) or default to a global migration limit of 60 mg/Kg (60 ppm). Substances listed with List B status have a default migration limit of 0.01 mg/Kg (10 ppb). Link to Swiss Ordinance Annex 10: https://www.bl-v.admin.ch/dam/blv/en/dokumente/lebensmittel-und-er-naehrung/rechts-und-vollzugsgrundlagen/lebensmittelre-cht2017/anhang10-verordnung-materialien-kontakt-lm-gg.pdf.download.pdf/Annex-10-ordinance-fdha-materials-and-articles-intended-to-come-into-contact-with-food-stuffs.pdf.

In the United States, Title 21 of the Code of Federal Regulations governs food and drugs within the United States. Title 21 is administered by the Food and Drug Administration, the Drug Enforcement Administration, and the Office of National Drug Control Policy. For food contact materials there is control of unintentional food additives. In FDA 21 CFR § 175.300(b)(1)-(3) Coatings may be formulated from:

Substances that are generally recognized as safe in food;
Substances the use of which are permitted by regulation or prior sanctions and employed under the specific conditions of the prior sanction or approval;
Substances that are the subject of another regulation and conform with any specifications in the other regulation; and
Substances specifically listed in 21 CFR § 175.300(b)(3).

Link to FDA 21 CFR § 175.300: https://www.govinfo.gov/app/details/CFR-2011-title21-vo13/CFR-2011-title21-vol3-sec175-300.

China adopted new overall Food Safety Law On June 1, 2009. This replaced the 1995 Food Hygiene Law and requires approval of all "food-related products", which includes food packaging materials and equipment used in production of food. This food safety law includes a Horizontal standard regulation GB9685-2016 which contains positive lists for additives in food contact materials. The food safety law also includes material standard regulations titled GB 4806.x where x denotes a number associated with a specific food contact material. Link to the China standard: https://www.chinesestandard.net/PDF.aspx/GB9685-2016

Inks used for non-direct-food-contact applications, such as inks may be printed on the outside of food packaging, typically contain pigments that are unsuitable for direct food contact applications. There are toxicological concerns with the pigments themselves, or more commonly because there are toxicological concerns with residual substances contained in the pigments. For example, most of the red, orange and yellow pigments used in food packaging are based on monoarylide or diarylide azo chemistry and therefore contain residual quantities of unreacted primary aromatic amines (PAAs). Residual levels of unreacted PAAs are typically controlled to levels dictated by the Council of Europe AP(89)1 resolution. For non-DFC applications, this is acceptable because PAAs have been shown to be relatively non-migratory, but for DFC applications migration could occur at levels unsafe for human consumption. The migration problem could be exacerbated by certain kinds of foods, such as acidic foods. In any event, migration amounts could result in unsafe food, thereby contravening the EU 1935/2004 regulation which provides that migration of substances from food contact materials should not endanger human health.

The migration issue is not limited to red, orange and yellow pigments. For example, the most common green pigment is Pigment Green 7, which has a chlorinated copper phthalocyanine structure. This pigment contains residual levels of hexachlorobenzene, which makes it unsuitable for DFC applications.

Some colorants are approved for use in cosmetic applications, and on first inspection it might appear that this could be a good starting point for DFC ink colorants. However, on closer inspection, in many cases the regulatory constraints on colorants for cosmetics is less severe than that for inks for food packaging. An example of this is the Council of Europe AP(89)1 standard, which is adopted by most ink manufacturers and by some regulatory authorities and has a restriction for PAA content (primary aromatic amine) in the colorant, and the European Cosmetics Regulation does not have such a restriction.

Some of the most common natural food coloring dyes are carotenoids, chlorophyll, anthocyanin, and turmeric. These dyes, which have been used for centuries, exhibit poor lightfastness, and thus the color will fade over time. Carotenoids have a deep red, yellow, or orange color. For example, beta-carotene, which is responsible for the bright orange color of sweet potatoes and pumpkins.

Chlorophyll is found in all green plants. This molecule absorbs sunlight and uses its energy to synthesize carbohydrates from carbon dioxide and water.

A good natural source for deep purple and blue colors is anthocyanin. Grapes, blueberries, and cranberries owe their rich color to this organic compound. Unlike beta-carotene, anthocyanins—which form a class of similar compounds rather than a single chemical compound—are soluble in water.

Other natural food dyes include:
Annatto (E160b), a reddish-orange dye made from the seed of the achiote (CAS number 1393-63-1);
Caramel coloring (E150a-d), made from caramelized sugar;
Carmine (E120), a red dye derived from the cochineal insect, *Dactylopius coccus;*
Elderberry juice (E163);
Lycopene (E160d);
Paprika (E160c);
Turmeric (E100);
Curcumin, a bright yellow chemical produced by *Curcuma longa* plants. It is the principal curcuminoid of turmeric (*Curcuma longa*), a member of the ginger family, Zingiberaceae. It is sold as an herbal supplement, cosmetics ingredient, food flavoring, and food coloring.
Chemical formula: $C_{21}H_{20}O_6$;
Appearance: Bright yellow-orange powder;
A DFC ink was made with the Curcumin dye based liquid at 25wt % into DFC-TVST1 and compared to the standard yellow DFC ink GAQS-20598. The food dye ink was very weak and had a lightfastness of less than blue wool 1. It faded completely within 11 minutes in the Xenotester.

Thus, there is a need for pigments and ink compositions containing same that are safe for direct and indirect food contact, while having a broader color gamut to enable the printing of more vibrant colors, and which offer satisfactory physical properties, such as rub resistance.

References that may be of interest include:
JP6152130—Printing paper;
US20110163179—Drinking straw with opaque, imprinted side;
GB787981—Improved method and apparatus for forming drinking straws or tubes having printed matter thereon;
U.S. Pat. No. 5,671,667—Multi-line straw printer; and
U.S. Pat. No. 6,155,478—Paper cup with sipping straw formed thereon.

SUMMARY OF THE INVENTION

The present invention relates to inks with a broad color gamut, especially for use in direct food contact (DFC) applications, having the properties of extended color gamut, improved dot printability, increased flexibility and sufficient physical and chemical resistance, with bright colors.

Described herein are printing inks that are safe for direct food contact, the inks each comprising an organic colorant of a preselected color, wherein the organic colorants and other chemical substances comprising the inks have migration values that are determined to be safe for contact with food by assessing the human exposure to the substance by either worst case calculation or by migration testing, and assessing the hazard of the substance by either reference to regulatory positive lists or by following an EFSA based substance hazard assessment process, and wherein the inks exhibit resistance to removal.

In another aspect, the described printing inks exhibit Chroma values (C) that are 10% or greater than the Chroma values (C) of inks colored by inorganic colorants of the same color.

In another aspect, the described printing inks exhibit Chroma values (C) that are 20% or greater than the Chroma values (C) of inks colored by inorganic colorants of the same color.

In another aspect, the organic colorants of the described printing inks are selected from Paliotol Yellow D1818, Irgazin Orange D2905, Irgazin Rubine L4025, Heliogen Blue D6840, Cromophtal Violet D5700, Suncroma C47-2222, and blends thereof.

In another aspect, the organic colorants of the described printing inks are selected from a pigment corresponding to one of the following color indexes: Yellow 139, orange 71, red 264, red 122 (which is pink in appearance), blue 15:0. Violet 37, black 7, white 6, and blends thereof.

In another aspect, the organic colorants of the described printing inks are selected from isoindoline yellow, diketopyrrolo-pyrrole orange, diketopyrrolo-pyrrole red, quinacridone red, phthalocyanine blue, dioxazin violet, carbon black, titanium dioxide, and blends thereof.

In another aspect, the migration values for the organic colorant and the other chemical substances in the described printing inks are equal to or below the threshold for a human of 60 kg in accordance with the EU Cube Model for food packaging, which is a 10 cm×10 cm×10 cm cube containing 1 kg food.

In another aspect, the migration values for the organic colorant and the other chemical substances in the described printing inks are equal to or below the threshold for a human of 70.3 kg in accordance with the paper straw scenario, described later in this disclosure.

In another aspect, the migration values for the organic colorant and the other chemical substances in the described printing inks are equal to or below the threshold for a human of 40.7 kg in accordance with the paper straw scenario.

In another aspect, the migration values for the organic colorant and the other chemical substances in the described printing inks are equal to or below the threshold for a human of 20.9 kg in accordance with the paper straw scenario.

In another aspect, the migration values for the organic colorant and the other chemical substances in the described printing inks are equal to or below the threshold for a human of 12.7 kg in accordance with the paper straw scenario.

In another aspect, the described printing inks further comprise a technical varnish comprised of at least some of the other chemical substances.

In another aspect, a water-based. acrylic emulsion safe for food contact s present in the technical varnish as at least one of the other chemical substances.

In another aspect, a wax, as at least some of the other chemical substances, present in the ink.

In another aspect, the described printing inks include, as at least some of the other chemical substances, additives selected from adhesion promoters, silicones, light stabilizers, de-gassing additives, ammonia, flow promoters, defoamers, antioxidants, stabilizers, surfactants, dispersants, plasticizers, rheological additives, waxes, silicones, etc., and combinations thereof.

In another aspect, described herein is a process for formulating an ink that is safe for direct contact with food, comprising:
a) establishing a safe migration limit for each substance used in the inks system; and
b) using only those substances that meet the safe migration limit.

In another aspect, described herein is a process for identifying organic colorants for an ink that is safe for direct contact with food, comprising
a) establishing a safe migration limit for each colorant; and
b) selecting colorants having a Chroma value ≥10% compared to a comparative inorganic colorant.

In another aspect, described herein is a set of printing inks that are safe for direct food contact, the inks of the set being of different colors and which provide a wide color gamut, the inks of the set comprising organic colorants, wherein the organic colorants and other chemical substances comprising the inks have migration values that are determined to be safe for contact with food by assessing the human exposure to the substance by either worst case calculation or by migration testing, and assessing the hazard of the substance by either reference to regulatory positive lists or by following an EFSA based substance hazard assessment process, and wherein the inks exhibit resistance to removal.

In another aspect, the set of printing inks comprises red, yellow, orange, blue, violet, black, pink and clear colored inks.

In another aspect, the Chroma value (C) of each of the inks of the set is 10% or greater than the Chroma value (C) of an ink colored by inorganic colorant of the same color.

In another aspect, the Chroma value (C) of each of the inks of the set is 20% or greater than the Chroma value (C) of an ink colored by inorganic colorant of the same color.

In another aspect, the migration values for the organic colorant and the other chemical substances contained in the inks of the set are equal to or below the threshold for a human of 60 kg in accordance with the EU Cube Model.

In another aspect, the migration values for the organic colorant and the other chemical substances contained in the inks of the set are equal to or below the threshold for a human of 70.3 kg in accordance with the paper straw scenario.

In another aspect, the migration values for the organic colorant and the other chemical substances contained in the inks of the set are equal to or below the threshold for a human of 40.7 kg in accordance with the paper straw scenario.

In another aspect, the migration values for the organic colorant and the other chemical substances contained in the inks of the set are equal to or below the threshold for a human of 20.9 kg in accordance with the paper straw scenario.

In another aspect, the migration values for the organic colorant and the other chemical substances contained in the inks of the set are equal to or below the threshold for a human of 12.7 kg in accordance with the paper straw scenario.

In another aspect, described herein is a printed article comprising a substrate and one or more of the printing inks of this disclosure.

In another aspect, the printed article, and a printed side thereof, is suitable for direct contact with food.

In another aspect, the substrate comprises paper, board, metallized paper, polyethylene, foil, metallized film, and polymeric films.

In another aspect, the article is a paper drinking straw.

In another aspect, described herein is a method of preparing a printed substrate that is safe for direct contact with food, comprising:
printing a substrate with one or more inks described herein; and
drying the substrate.

In another aspect, described herein are printing inks safe for direct food contact, each individual ink comprising an organic colorant of a preselected color, wherein the organic colorants and other chemical substances comprising the inks have migration values that are determined to be safe for contact with food by one or both of (a) migration testing of the organic colorants and other chemical substances; and (b) compliance with regulations setting forth amounts of the organic colorants that deemed to be safe for contact with food, and wherein the inks exhibit resistance to removal.

In one aspect, the resistance to removal exhibited by the inks means that when the inks are printed on surfaces that are exposed to liquid reagents, the inks exhibit resistance to removal. In another aspect, the resistance to removal exhibited by the inks means that when the inks are printed on surfaces that are rubbed, such as when the ink-containing surfaces are wet and/or when they are dry, the inks are resistant to removal, such as might occur during ordinary use of the printed article, which for example could be food packaging or a drinking straw, among other articles. The inks may exhibit all of these aspects.

The choice of pigments that are safe for direct food contact is an aspect of the present disclosure. Within the regulatory frameworks of the U.S., European Union, and China, there is no list of organic pigments which are suitable for direct food contact (DFC) ink applications. Applicants have found pigments that are direct food contact safe, that provide wide color gamut, and which offer chemical and physical resistance.

The problems associated with residual substances found in the pigments that raise toxicological concerns were discussed earlier in this disclosure. In some instances concerning the pigments used to make the DFC inks described herein, a higher purity version of a commonly used pigment of a particular color index number can be used. An example of this is Pigment Black 7, carbon black which is among the pigments described herein found to be safe for direct food contact. This pigment is normally manufactured by thermal decomposition and partial combustion of a fuel source and then collecting the soot or ash. Variants that affect the quality of the resulting Pigment Black 7 include but are not limited to the starting fuel, the geometry of thermal decomposition and partial combustion, oxygen levels, temperature, and the method of collection. In all cases, some levels of polycyclic aromatic hydrocarbons are formed, which are substances that can be of toxicological concern. In this invention, the grade of Pigment Black 7 includes a concentration of polycyclic aromatic hydrocarbon that is less than a tenth of that ordinarily found in grades of Pigment Black 7 recommended for food contact material applications. In other cases, pigments which are not normally used in food contact material applications have been chosen for this invention due to them either having very low levels of residual substances or having residual substances that were of low toxicological concern.

The present disclosure relates to inks with a broad color gamut that can be used for printing materials that have direct food contact (DFC) applications, having the properties of extended color gamut, improved dot printability, increased flexibility, and sufficient physical and chemical resistance, with bright colors. The benefits of the present inventive inks can be assessed by considering the following four (4) scenarios:

1. Direct food contact inks made with food colorants are safe for direct food contact use and have a wide color gamut, but these inks do not have offer resistance to removal properties;
2. Direct food contact inks made with inorganic pigments such as iron oxides are safe for direct food contact use and have effective resistance properties, but do not have a wide color gamut;
3. Inks made for non-direct food contact applications have effective resistance properties and a wide color gamut, but are not safe for use in direct food contact applications.
4. Inks described herein are safe for direct food contact use and have a wide color gamut and have resistance properties.

These four scenarios are set forth in the Venn diagram shown in FIG. 5, where the 4$^{th}$ scenario corresponds to the inks described herein, with the inks being safe for direct food contact applications, providing wide color gamut, and have resistance properties.

DETAILED DESCRIPTION OF THE INVENTION

Figure 1:
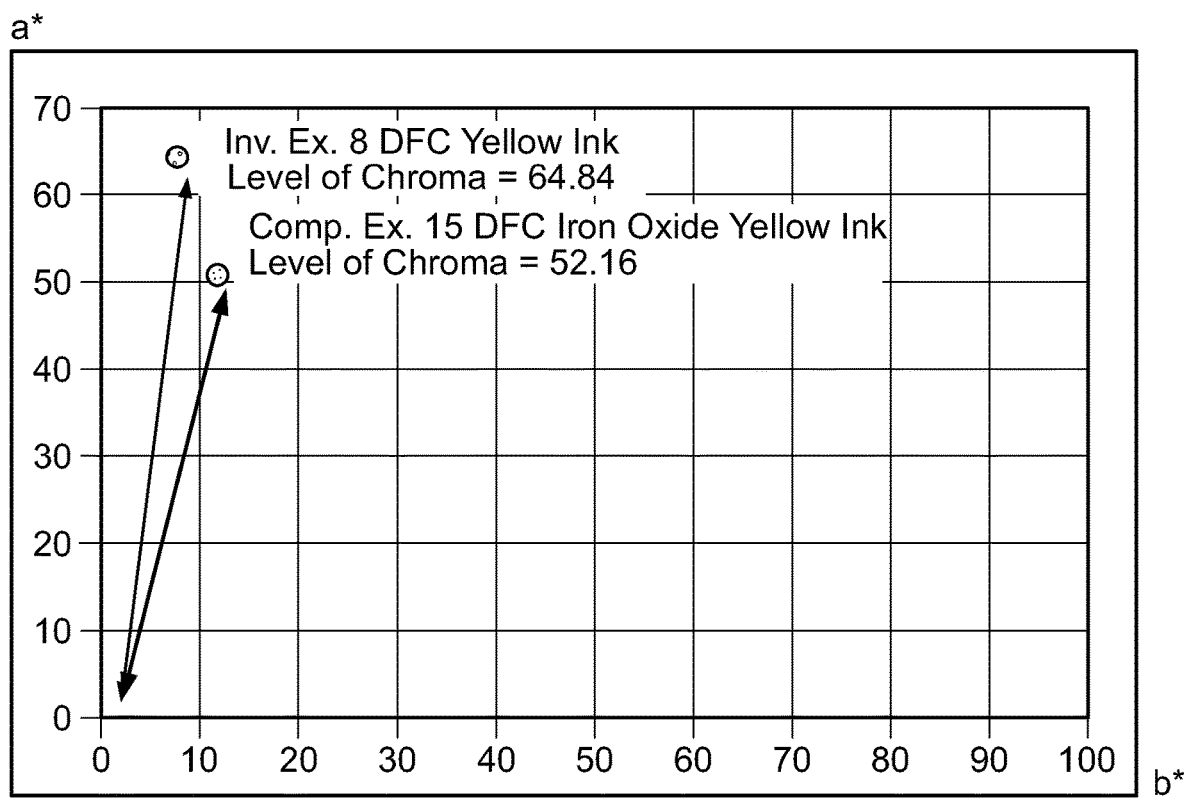
FIG. 1 is a plot of the a* and b* values for the Example 8 direct food contact yellow ink and the comparative example 15 yellow ink.

Certain terms used in this disclosure have the following meanings:

"Migration value"—an amount of a substance that can migrate from an ink into a surrounding environment, expressed as mg/kg food or µg/kg food. The amount is either the maximum amount possible under a worse case calculation or the amount determined in migration testing.

"Worst case calculation" a migratory amount for a substance that is based on the assumption that all of the substance in the ink composition migrates out of the ink and into food (i.e., 100% migration).

"Migration testing" refers to testing performed by GC-MS (gas chromatography-mass spectrometry) analysis and/or liquid chromatography-mass spectrometry (LC-MS) analysis. Testing methodology is: Prints, 100 cm$^2$, were extracted into 20 ml of 50% ethanol for 6 hours at room temperature. After 6 hours, the prints were removed and a 1 ml aliquot was analysed by HPLC-MS (using the IM373 instrument parameters). The remaining sample was liquid-liquid extracted into 40 ml dichloromethane (DCM). The DCM was then evaporated to 1 ml and run on GC-MS (IM304 instrument parameters). The print samples were compared to the virgin substrate provided and only the ink-related peaks were identified.

"Regulatory positive lists"—lists set forth in one or more of EU Plastics Regulation, EFSA Opinion, Provisional List of Additives used in Plastics, and Swiss Ordinance in Table 11. Key sections include:

Plastics Regulation (EU) No 10/20011. The Plastics Regulation contains a positive list of substances with Specific Migration Limits. Link to regulation: https://eur-lex.europa.eu/legal-content/EN/TXT/?qid=1592209990405&uri=CELEX:32011R0010 (previously mentioned on page 2);

Link to EFSA website: http://www.efsa.europa.eu/

Link to Provisional list of additives used in plastics: https://ec.europa.eu/food/sites/food/files/safety/docs/cs_fcm_legis_additives-prov-list.pdf Link to Swiss Ordinance Annex 10: https://www.blv.admin.ch/dam/blv/en/dokumente/lebensmittel-und-ernaehrung/rechts-und-vollzugsgrundlagen/lebensmittelrecht2017/anhang10-verordnung-materialien-kontakt-lm-gg.pdf.download.pdf/Annex-10-ordinance-fdha-materials-and-articles-intended-to-come-into-contact-with-food-stuffs.pdf (previously mentioned on page 3).

"EFSA based substance hazard assessment process" is based on the Threshold of Toxicological Concern approach to hazard assessment from the European Food Safety Authority (EFSA) as developed in the following documents:

1. EFSA Document: Outcome of the public consultation on the draft guidance on the use of the Threshold of Toxicological Concern approach in food safety assessment. APPROVED: 17 May 2019, doi:10.2903/sp.efsa.2019.EN-1661
2. EFSA Document: Guidance on the use of the Threshold of Toxicological Concern approach in food safety assessment, ADOPTED: 24 Apr. 2019, doi: 10.2903/j.efsa.2019.5708
3. EFSA Document: Priority topics for the development of risk assessment guidance by EFSA's Scientific Committee in 2016-2018, ADOPTED: 19 May 2016, doi: 10.2903/j.efsa.2016.4502

4. EFSA and WHO document: Review of the Threshold of Toxicological Concern (TTC) approach and development of new TTC decision tree. PUBLISHED: 10 Mar. 2016
5. EFSA Document: Scientific Opinion on Exploring options for providing advice about possible human health risks based on the concept of Threshold of Toxicological Concern (TTC). EFSA Journal 2012; 10(7):2750; and
6. European Printing Ink Trade Association (EuPIA) document: EuPIA Guidance for Risk Assessment of Non-Intentionally Added Substances (NIAS) and Non-Evaluated or Non-Listed Substances (NLS) in printing inks for food contact materials", available at: https://www.eupia.org/fileadmin/Documents/Risk Assessment/2020-03 -12-EuPIA_NIAS_Guidance.pdf. In particular, see the schematic on page 15.

"Resistance to removal" is obtaining a score of 4 or greater on one or more of the following tests, when the inks are printed on a paper substrate:
Immersion test;
Bleed test; and
SATRA dry rub resistance test;
With the results of these tests being assessed on a scale of 1 to 5. The methodologies for these tests are set forth elsewhere in this paper.

"Wide color gamut" refers to the six (6) main color indexes covered by the organic colorants described herein (i.e., the six color indexes named in Table 2) which together with black attain 98% of the Pantone Matching System (PMS) shades.

In developing the present disclosure regarding direct food contact inks and other chemical substances present in the inks, the inventors have drawn on ink and pigment chemistry, analytic capabilities and regulatory risk assessment skills to determine colorants and other chemical substances that can safely be used in DFC inks. These determinations include the assessment of substances that could possibly migrate into food at levels that could endanger human health and/or be considered to be unintentional food additives present at levels which could endanger human health.

The following approach was taken to find colorants (preferably organic colorants) and other materials suitable for inks sage for direct food contact:
1. Pigment color index numbers representing colors across the visible light spectrum were considered to determine which color index numbers might not contain substances that were of concern from a food safety perspective. We also considered where in color space these pigments would be so that a wide color gamut ink set could be provided (7 main color index to achieve 98% of Pantone Matching System (PMS) shades);
2. Information was sought from pigment manufacturers for purposes of identifying grades of pigment corresponding to the color index numbers determined in step 1 as possibly being safe, on the premise that such pigment grades might not contain substances that migrate at toxic (i.e., unsafe) levels;
3. Other substances used to formulate inks and coatings (resins, solvents, additives, etc.) which are food safe and/or have low migration levels were identified;
4. Analytical testing, that is, migration testing, was performed on both pigments and other materials as supplied. Further, after ink formulation and printing the inks on substrates, migration testing was performed to determine the amounts at which the ink components, that is, the pigments and other substances migrated;
5. Based upon information known about impurities within the pigments and other substances, information acquired from suppliers, manufacturers, etc., and information provided by analytical data collected in the extraction and migration testing, substances that could be of concern in terms of possibly not complying with regulations governing amounts safe for direct food contact were determined;
6. A safe migration limit (SML), that is, an amount, if migrated out of the ink and into the surrounding food would be safe to a human, was established for each of these substances. Many of these substances are NIAS and thus do not have published migration limits, as NIAS are out of scope of many of the specific regulations. However, it is still possible to use a risk assessment based methodology, considering the toxicology of the substance and an appropriate exposure model to create a self-derived migration limit. Applying this methodology, it was determined that the materials used do not contain substances that will migrate into food at levels that could endanger human health, with a significant margin for safety.

This process is illustrated in the following steps:
A. Identify colorants and other materials determined to be of low migration, low extraction and low toxicity in accordance with 1-6 above;
B. Select colorants that meet color gamut qualifications in accordance with 1-6 above;
C. Perform analytical testing to confirm that the colorants and other materials meet the criteria set out for steps A and B; and
D. Employ only colorants other materials that meet the criteria for A and B;

In addition to being safe for direct food contact and providing, wide color gamut, the inks should also exhibit good adhesion to substrates and exhibit resistance to removal properties.

In one aspect, the inks described herein comprise a set of inks that meet the criteria of safety, adhesion, and resistance properties. The ink set may comprise direct food contact inks of the following colors: black, orange, red, yellow, violet, blue, pink, white, and dear. White derives from titanium dioxide, which is inorganic, and thus in another alternative aspect, white coloring would not be included in the ink set.

Clear ink is a non-pigmented version of the colored inks, such as a blend of the Example 1 Technical Varnish with wax and/or additives as needed, as described below.

Mends of the above referenced colorants to produce inks of other colors (e.g., green ink) can be produced. Also, additional colors that are based on pigments (preferably organic pigments) and other materials that are considered safe for DEC in amounts that are below the SML (specific migration limit) as illustrated in Tables 11-16 below can he used and or produced.

In one aspect, the direct food contact inks can be made from the formulation of two intermediates (i.e. a pigment concentrate and a technological varnish), in which case, the pigment concentrate would provide the desired shade and color strength, while the technological varnish provides the chemical and physical resistance properties.

In one aspect, when forming a print on a substrate, a primer coat may be applied prior to applying the ink. In another aspect, an overprint varnish (OPV) may be applied over the ink, In another aspect, all three of a primer, ink, and overprint varnish are applied to the substrate. These aspects enhance the resistance properties of the final printed layers. The inks may also be used with and without an OPV, and still retain their overall resistance properties.

The described inks may also include waxes. Such waxes include but are not limited to amide wax, erucamide wax, polypropylene wax, paraffin wax, polyethylene wax, Teflon®, carnauba wax and the like. The wax may be a combination of two or more waxes. In one aspect, a blend of amide and erucamide waxes are included in the ink compositions. The wax, if present, is present in an amount of about 0.1 wt % to about 4.0 wt %, based on the total weight of the composition. It is preferred that the wax be present in an amount from about 0.1 wt % to about 2.0 wt %.

As with most ink and coating compositions, additives may be incorporated to enhance various properties. A partial list of such additives includes but is not limited to adhesion promoters, silicones, light stabilizers, de-gassing additives, ammonia, flow promoters, defoamers, antioxidants, stabilizers, surfactants, dispersants, plasticizers, theological additives, waxes, silicones, etc., and combinations thereof.

The inks described herein are preferably suitable for priming on paper, board, foil, metallized paper or film, and polymeric films, among, other materials. The printed materials may be formed into various food contact products, such drinking straws, cups, food trays, food containers, food packaging, food wrapping, utensils, among other items.

The described inks can be formulated for printing in accordance with just about any printing method, such as inks for lithographic, screen, flexo, gravure, inkjet printing, among others.

EXAMPLES

The following examples illustrate specific aspects of the present invention and are not intended to limit the scope thereof in any respect and should not be so construed.

As indicated, the described inks may include a technical varnish that is safe for direct contact with food. An exemplary varnish composition is found below:

Example 1: DR: Technical Varnish (DFC-TV)

TABLE 1

| Raw Material | Amount (wt %) |
| --- | --- |
| Water | 13.55 |
| Water-based DFC Acrylic emulsion (Carboset ® GAW7448 from Lubrizol) | 84.30 |
| Antifoam (Xiameter ™ 1510 from Dow) | 0.10 |
| Biocide (Proxel ™ BD20 from Lonza) | 0.05 |
| Isopropanol | 2.00 |
| Total | 100.00 |

Suitable acrylic emulsions are available from BASF, DSM, Lubrizol, Exograph, etc. Another suitable acrylic emulsion is Joncryl® ECO2124 from BASF Formulators will select the acrylic emulsion that best suits their end use requirements. Amounts can be varied ±2.0% from what is stated above.

Organic Colorants Safe for Direct Food Contact

Table 2 lists pigments that applicants have found to be safe for direct contact with food, providing wide color gamut, and excellent resistance properties:

TABLE 2

| Color | Pigment CI number | SAP Code | Pigment grade | Pigment chemistry |
| --- | --- | --- | --- | --- |
| Yellow | Yellow 139 | 30012138 | Paliotol Yellow D 1819 | Isoindoline |
| Orange | Orange 71 | 30504804 | Irgazin Orange D 2905 | DPP (diketopyrrolo-pyrrole) |
| Red | Red 264 | 30504783 | Irgazin Rubine L 4025 | DPP (diketopyrrolo-pyrrole) |
| Red (Pink) | Red 122 | 30518052 | Fastogen CBR3 | Quinacridone |
| Blue | Blue 15:0 | 30507645 | Heliogen Blue D6840 | Phthalocyanine blue |
| Violet | Violet 37 | 30012410 | Chromophtal Violet D 5700 | Dioxazin |

Carbon black and titanium dioxide can be mixed with these colors in order to provide a wider range of colors. Suitable are carbon blacks available from Sensient Technologies, New Jersey, USA, or Sun Chemical, New Jersey, USA. Suitable titanium dioxide is available from Venator Materials PLC, Houston Tex., USA.

Examples 2-7: Color Concentrate Bases

Color concentrate bases were prepared by blending the direct food contact technical varnish described in Example 1 with the DFC base concentrate described in Table 2. Inks are prepared by mixing the technical varnish with the DFC base concentrate. Amounts can be varied ±2.0% of the stated value.

TABLE 3

| DFC Base conc. | Ex. 1 DFC-TV (wt %) | Paliotol ® Yellow D1818 (wt %) | Irgazin Orange D2905 (wt %) | Irgazin Rubine L4025 (wt %) | Heliogen Blue D6840 (wt %) | Cromophtal Violet D5700 (wt %) | Suncroma C47-2222 (wt %) |
| --- | --- | --- | --- | --- | --- | --- | --- |
| Ex. 2: DFC Yellow | 85 | 15 | | | | | |
| Ex. 3: DFC Orange | 86.5 | | 13.5 | | | | |
| Ex. 4: DFC Red | 80 | | | 20 | | | |
| Ex. 5: DFC Blue | 80 | | | | 20 | | |
| Ex. 6: DFC Violet | 80.5 | | | | | 19.5 | |
| Ex. 7: DFC Black | 80 | | | | | | 20 |

Examples 8-13: Inks Safe for Direct Food Contact

Inks safe for direct food contact are set forth in Table 4.

TABLE 4

| Inks | DFC-TV (wt %) | Carnauba Wax (wt %) | Ex. 2 Yellow Base (wt %) | Ex. 3 Orange Base (wt %) | Ex. 4 Red Base (wt %) | Ex. 5 Blue Base (wt %) | Ex. 6 Violet Base (wt %) | Ex. 7 Black Base (wt %) |
|---|---|---|---|---|---|---|---|---|
| Ex. 8: DFC Yellow | 36 | 2.0 | 62 | | | | | |
| Ex. 9: DFC Orange | 53 | 2.0 | | 45 | | | | |
| Ex. 10: DFC Red | 47 | 2.0 | | | 51 | | | |
| Ex. 11: DFC Blue | 36 | 2.0 | | | | 62 | | |
| Ex. 12: DFC Violet | 51 | 2.0 | | | | | 47 | |
| Ex. 13: DFC Black | 8.2 | 1.8 | | | | | | 90 |

Example 14: DFC Over-Lacquer

A DFC Over-Lacquer was prepared by mixing 98 wt % DFC-TV of Example 1 with 2.0 wt % Carnauba Wax.

Print Preparation

Ink viscosity is reduced with water to 25s as measured in a Zahn 2 cup at 20° C. and printed onto MGBK paper using a 9.5 cc/m² anilox (except black which used a 12 cc/m² anilox) at 50 m/min on a Windmoeller & Hoelscher Soloflex printing press. Drying ovens were maintained at 60° C. MGBK paper is a typical paper board used for paper straw manufacture. During drying, maximum airflow is preferred.

The resulting prints were tested for brightness, immersion properties, bleed, and rub resistance. The results are shown in Tables 5-9 below. The inks described herein were compared to commercially available drinking straws and commercially available DFC inks based on iron oxide pigments, available from Sun Chemical. It should be noted that the inks described herein give either similar or better properties when compared to the other inks having an overprint varnish over layer.

It is also possible to produce the inks without first making a pigment concentrate and varnish by simply grinding the pigment into a base and blending the resultant material with the remaining ink formulation ingredients.

Table 5—Color

Using an X-Rite Exact spectrophotometer (illuminant D50; observer angle 2°; filter MO) the brightness/cleanliness of the inks described herein was measured comparing them to the direct food contact approved inks using iron oxide-based pigments.

TABLE 5

| Ink | Description | L | a* | b* | C | H |
|---|---|---|---|---|---|---|
| Ex. 8 | DFC Yellow Ink | 86.93 | 7.68 | 64.38 | 64.84 | 83.20 |
| Ex. 9 | DFC Orange Ink | 75.38 | 34.18 | 49.73 | 60.34 | 55.50 |
| Ex. 10 | DFC Red Ink | 49.86 | 57.26 | 19.33 | 60.44 | 18.65 |
| Ex. 11 | DFC Blue Ink | 45.52 | −8.55 | −52.21 | 52.91 | 260.70 |
| Ex. 12 | DFC Violet Ink | 36.40 | 27.96 | −34.37 | 44.30 | 309.13 |
| Ex. 13 | DFC Black Ink | 29.33 | 0.37 | 0.39 | 0.54 | 46.56 |
| Ex. 14 | DFC Pink Ink | 54.20 | 61.73 | −12.83 | 63.05 | 348.27 |
| Comp. Ex. 15 | [1]DFC Yellow Oxide Ink | 82.14 | 11.76 | 50.82 | 52.16 | 76.97 |
| Comp. Ex. 16 | [2]DFC Red Oxide Ink | 53.51 | 38.91 | 26.78 | 47.24 | 34.53 |

TABLE 5-continued

| Ink | Description | L | a* | b* | C | H |
|---|---|---|---|---|---|---|
| Comp Ex 17 | Ultramarine Inorganic Blue Ink | 43.2 | −0.40 | −35.1 | 35 | 269 |

[1]WBDEV603 ink (Sun Chemical);
[2]WBDEV604 ink (Sun Chemical)
L = Lightness;
a* = red/green axis,
b* = yellow/blue axis
C = Chroma;
H = Hue As the color range of iron oxide pigments is limited to dull, dirty shades of brown red, yellow and black. The ability to provide bright clean hues for end users is practically non-existent. This demonstrates the significance of the direct food contact compliant pigments and inks described herein, which have a wide color gamut that provides the majority of the PMS shades and thus makes possible more options for the end user of the inks.

The table above set forth the color data measure on an Xrite spectrophotometer under D50, a CIE "warm" daylight illuminant with a viewing field of 2°. The table makes possible a comparison of the commercially available DFC inks based on iron oxide pigments (i.e., the comparative examples) to the DFC inks described herein. As shown, the DFC inks described herein exhibit brightness and cleanliness that far exceeds the iron oxide DFC inks. For example, the DFC yellow and red inks described herein are lighter and exhibit a higher color purity and intensity (Chroma) when compared to the iron oxide inks.

The DFC yellow and red inks described herein are lighter with higher intensity (Chroma, the C value) when compared to the iron oxide inks.

Color Gamut:

A broad color gamut will include base colors at the more outer lying positions in the CIELAB color space. These colors will be cleaner in shade (higher Chroma value C), thus enabling a wider range of shades to be matched from blending different base colors. Chroma (C) is the square root of the sum of the squares of a* and b*.

The Comparative Ex. 16 ink includes an inorganic red oxide pigment has a Chroma value (C) of 47.24 while the Inventive Ex. 10 red ink including an organic pigment (Irgazin Rubine L4025) has a Chroma value of 60.44, which is 28% higher than Comparative Ex. 16. The Comparative Ex. 15 ink includes an inorganic yellow oxide pigment and has a Chroma value of 52.16, whereas the Inventive Ex. 8 including an organic yellow pigment (Paliotol Yellow D1818) has a C of 64.84, which is 24% higher. The Comparative Ex. 17 ink includes an inorganic blue pigment and has a Chroma value of 35, whereas the Inventive Ex. 11 including an organic blue pigment (Heliogen Blue D6840) has a C=52.9, which is 51% higher.

It is well known in the art of color physics that red and yellow represent the colors that are the most difficult to obtain a broad color gamut with the use of organic pigments vs. inorganic (e.g. iron oxide pigments). Thus, the % increase in Chroma would be equal to or higher for the remaining colors in the inventive ink set vs. comparative inks based on inorganic pigments (e.g. iron oxide pigments).

In one aspect, the Chroma values for the presently described inks are at least 10% higher than their inorganic equivalents (e.g. iron oxide equivalent). In another aspect, the Chroma values for the presently described inks are at least 20% higher.

Figure 2:
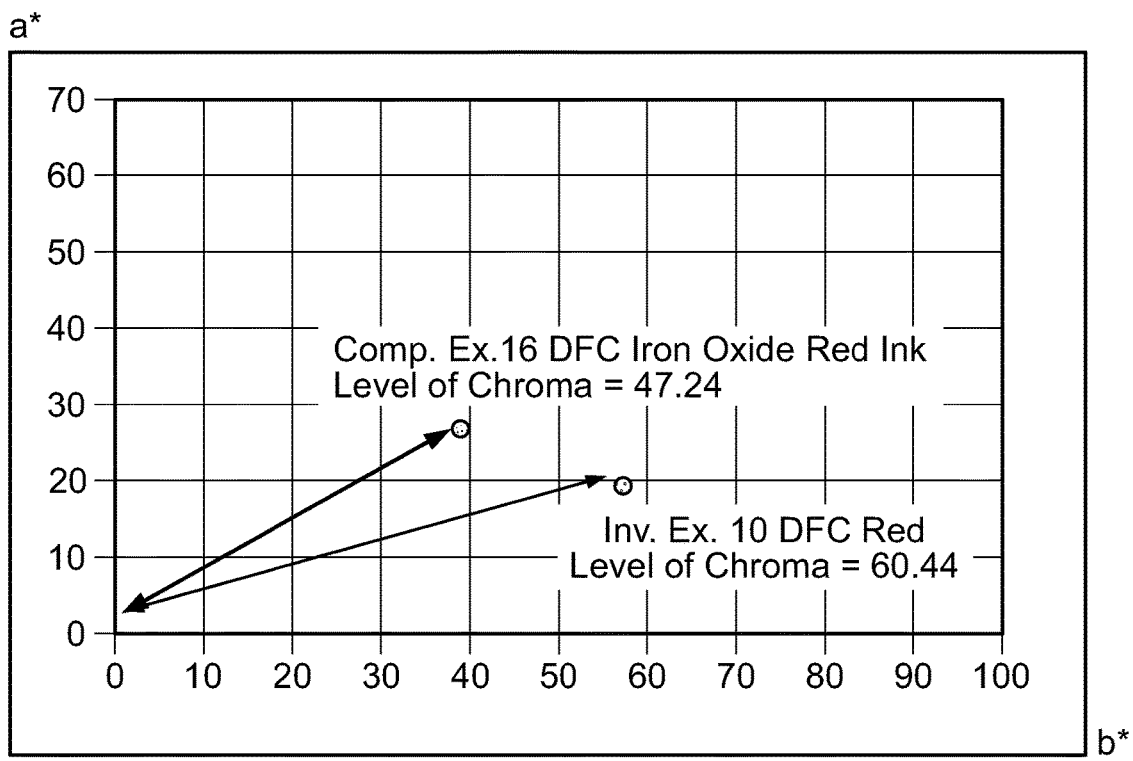
FIG. 2 is a plot of the a* and b* values for the Example 10 direct food contact red ink and the comparative example 16 red ink.

FIGS. 1 and 2 demonstrate this point. FIG. 1 shows that the Example 8 DFC Yellow ink has 24% higher Chroma than the Comparative Example. 15 when proofed under the same conditions Proofing conditions were flexo with a 200# anilox hand roller.

FIG. 2 shows that the Inventive Ex. 10 DFC Red ink has 28% higher Chroma than the Comparative Ex. 16 when proofed under the same conditions.

Figure 3:
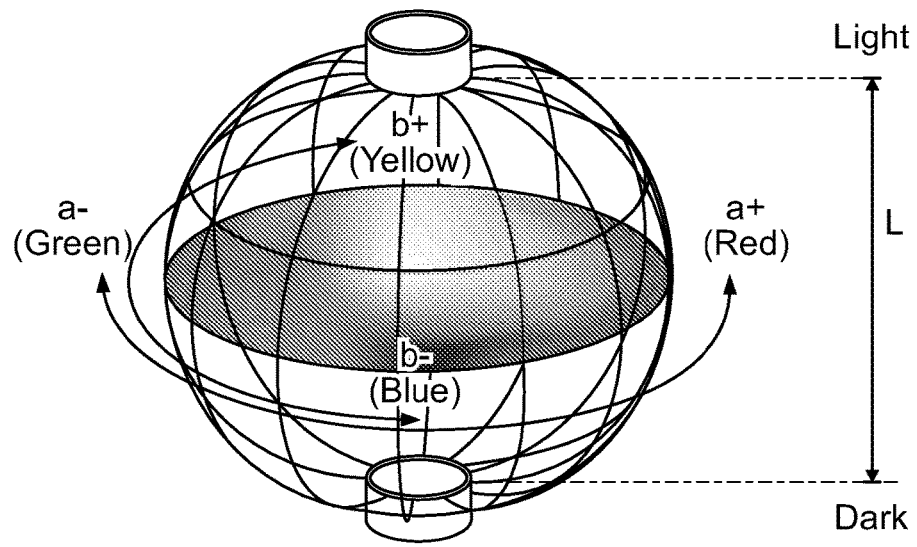
FIG. 3 is a spherical representation of the CIELAB color space.
Figure 4:
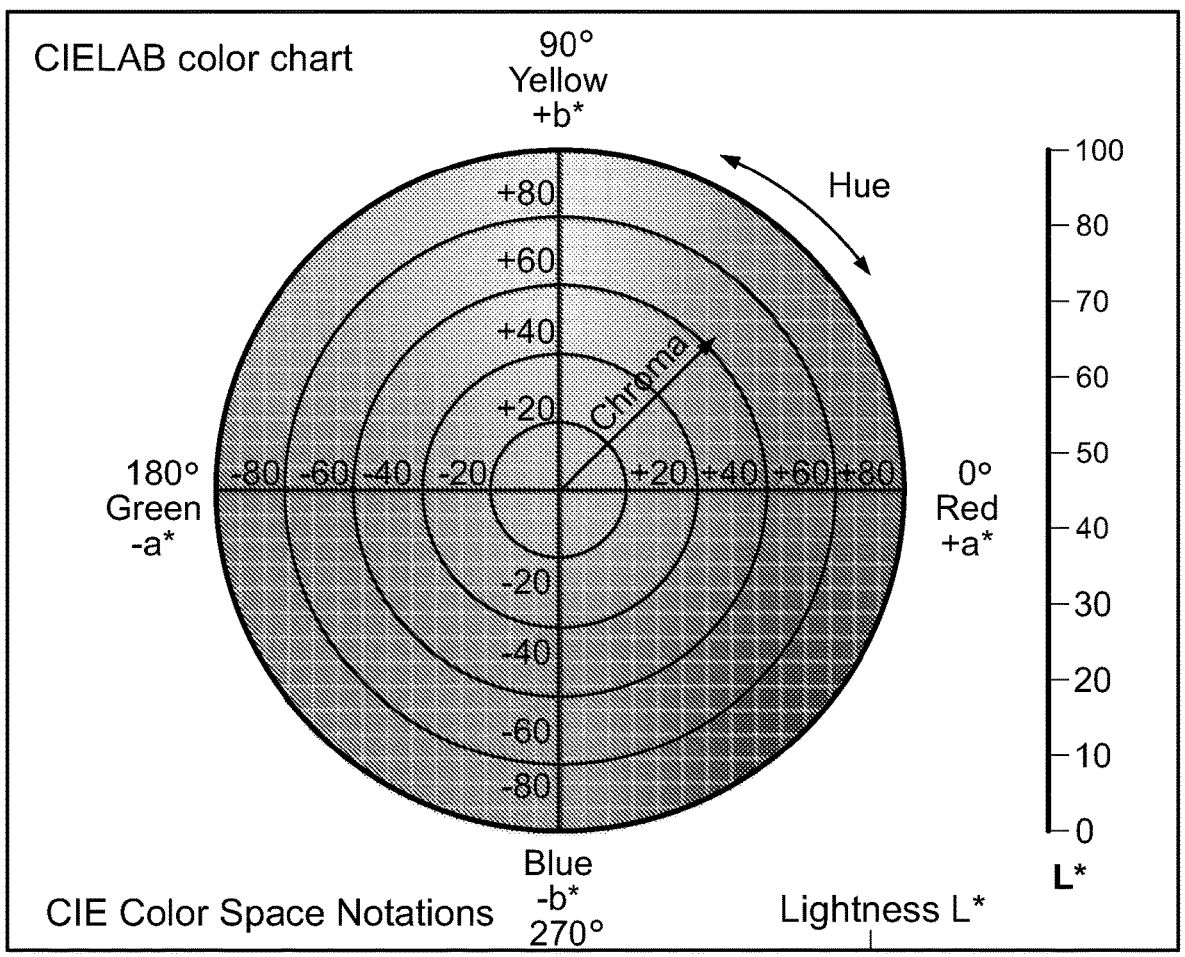
FIG. 4 is a two dimensional representation of the CIELAB color space.
Figure 5:
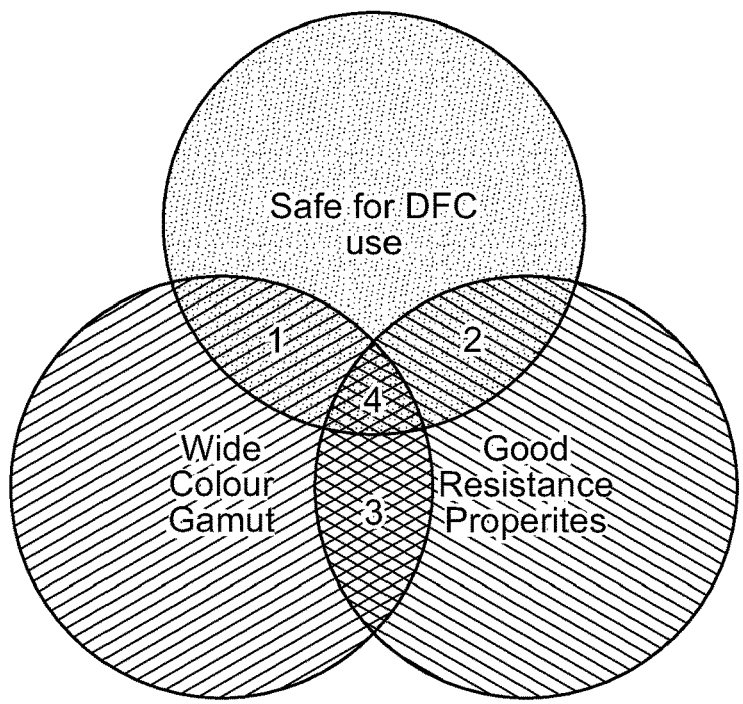
FIG. 5 is a Venn diagram showing the advantages of the inks described herein and the disadvantages of various state of the art inks when considered for direct food contact use.

As shown in FIGS. 3 and 4, the CIELAB color space (also known as CIE L*a*b* or sometimes abbreviated as simply "Lab" color space) is a color space defined by the International Commission on Illumination (CIE) in 1976. It expresses color as three values: L* for the lightness from black (0) to white (100), a* from green (—) to red (+), and b* from blue (—) to yellow (+).

Since the L*a*b* model is a three-dimensional model, it can only be represented properly in a three-dimensional space. Two-dimensional depictions include chromaticity diagrams: sections of the color solid with a fixed lightness.

FIG. 4 depicts the CIELCh color space as a CIELab cube color space, where instead of Cartesian coordinates a* and b*, cylindrical coordinates C* (Chroma, relative saturation) and h° (hue angle, angle of the hue in the CIELab color wheel) are specified. The CIELab lightness L* remains unchanged. At low values of Chroma, colors are weak, exhibiting pastel shades, often with a dirty and/or muddy tone. At high values of Chroma, colors are strong, vibrant and clean. Chroma value is used in this description to demonstrate the differences between the colors produced by an inorganic iron oxide based ink and the direct food contact inks described herein which provide wide color gamut.

The inks described herein were subjected to immersion, bleed and rub tests in which they were compared to the comparative iron oxide inks.

In the immersion test, prints were submerged in liquid reagents, then removed after 1 hour and assessed by pat drying to determine if there's any removal of print.

TABLE 6

| | | | Immersion Tests: 1-hour immersion in various reagents | | | | |
|---|---|---|---|---|---|---|---|
| Test | Inv. Ex. 8 Yellow | Inv. Ex. 9 Orange | Inv. Ex. 10 Red | Inv. Ex. 11 Blue | Inv. Ex. 12 Violet | Comp. Ex 15 | Comp. Ex 15 + OPV |
| Water | 5 | 5 | 5 | 5 | 5 | 5 | 5 |
| 40% ethanol/water | 5 | 5 | 5 | 5 | 5 | 5 | 5 |
| Cola | 5 | 5 | 5 | 5 | 5 | 5 | 5 |
| Orange Juice | 5 | 5 | 5 | 5 | 5 | 5 | 5 |
| Tea (80° C.) | 5 | 5 | 5 | 5 | 5 | 5 | 5 |
| Coffee (80° C.) | 5 | 5 | 5 | 5 | 5 | 5 | 5 |
| Milkshake | 5 | 5 | 5 | 5 | 5 | 5 | 5 |
| Olive Oil | 5 | 5 | 5 | 5 | 5 | 5 | 5 |

Scale: 5 = No removal; 1 = Total removal

Table 2 shows that the inks described herein have immersion properties comparable to the commercially available iron oxide inks used in the comparative examples, which inks are used to print drinking straws, among other uses.

In the bleed tests, the prints were placed onto pieces of filter paper on top of glass squares and soaked in the liquid reagents set forth in Table 3. Another filter paper was placed on top with a glass square blocking the sandwich and a 1 kg weight to provide pressure. After 18 hours, the weight was removed, the layers were disassembled, and the prints were patted dry. Any removal of ink was recorded.

TABLE 7

| | | | Bleed Tests | | | | |
|---|---|---|---|---|---|---|---|
| Lab Test | Inv. Ex. 8 Yellow | Inv. Ex. 9 Orange | Inv. Ex. 10 Red | Inv. Ex. 11 Blue | Inv. Ex. 12 Violet | Comp. Ex 15 | Comp. Ex 15 + OPV |
| Water | 5 | 5 | 5 | 5 | 5 | 5 | 5 |
| 40% ethanol/water | 5 | 5 | 5 | 5 | 5 | 5 | 5 |
| Cola | 5 | 5 | 5 | 5 | 5 | 5 | 5 |
| Orange Juice | 5 | 5 | 5 | 5 | 5 | 5 | 5 |
| Tea (80° C.) | 5 | 5 | 5 | 5 | 5 | 5 | 5 |
| Coffee (80° C.) | 5 | 5 | 5 | 5 | 5 | 5 | 5 |
| Milkshake | 5 | 5 | 5 | 5 | 5 | 5 | 5 |
| Olive Oil | 5 | 5 | 5 | 5 | 5 | 5 | 5 |

Scale: 5 = No removal, 1 = Total removal

Table 3 shows that the inks described herein have bleed resistance that is comparable to the iron oxide inks and commercially available straw inks of the comparative examples.

TABLE 8

SATRA Rub Tests

| Lab Test | Inv. Ex. 8 Yellow | Inv. Ex. 9 Orange | Inv. Ex. 10 Red | Inv. Ex. 11 Cyan | Inv. Ex. 12 Violet | Comp. Ex 15 | Comp. Ex 15 + OPV |
|---|---|---|---|---|---|---|---|
| Dry SATRA | 5 | 5 | 5 | 5 | 5 | 5 | 5 |
| Wet SATRA | 3 | 3 | 3 | 3 | 3 | 4 | 3 |
| Wet finger | 3 | 3 | 3 | 3 | 3 | 4 | 4 |

Scale: 5 = No removal, 1 = Total removal; PB = Paper break down.
SATRA dry rub resistance test: 100 rubs at 2 psi pressure.
SATRA wet rub resistance check, 10 rubs, no weight. Wet finger, 10 finger rubs with medium pressure after the print has been soaked in water for 1 hour.

Paper breakdown occurs when the printed paper is rubbed either mechanically or manually and the fibres of the substrate break down and wear off, taking the ink layer with it. As the ink has been absorbed to an extent by the paper, when viewed under a magnifying glass, the rolls of paper/ink can be clearly seen. As the adhesion between the paper fibres cannot withstand the abrasion, this layer fails and is denoted by a lower number than 5 in the table.

As seen in Table 8, the inks described herein performed similarly to the comparative inks.

Other Substrates

The inks of Examples 8-12 were printed onto white polyethylene film treated to 44 dynes. The inks were subjected to immersion testing and rub testing.

Immersion Tests: 1-hour Immersion in Various Reagents

The prints were aged overnight and then submerged in the liquid reagents listed in Table 9 below. Then they were removed after 1 hour and assessed by pat drying to determine if there was any removal of print.

TABLE 9

| Test | Inv. Ex. 8 Yellow | Inv. Ex. 9 Orange | Inv. Ex. 10 Red | Inv. Ex. 11 Blue | Inv. Ex. 12 Violet | Comp. Ex. 15 Iron oxide red |
|---|---|---|---|---|---|---|
| Water | 5 | 5 | 5 | 5 | 5 | 5 |
| 40% ethanol/water | 5 | 5 | 5 | 5 | 5 | 5 |
| Cola | 5 | 5 | 5 | 5 | 5 | 5 |
| Orange Juice | 5 | 5 | 5 | 5 | 5 | 5 |
| Tea (80° C.) | 5 | 5 | 5 | 5 | 5 | 5 |
| Coffee (80° C.) | 5 | 5 | 5 | 5 | 5 | 5 |
| Milkshake | 5 | 5 | 5 | 5 | 5 | 5 |
| Olive Oil | 5 | 5 | 5 | 5 | 5 | 5 |

Scale: 5 = No removal; 1 = Total removal b) Rub Tests

SATRA dry rub resistance check, 100 rubs with 2 psi
SATRA wet rub resistance check, 10 rubs, no weight
Wet finger, 10 finger rubs with medium pressure after the print has been soaked in water for 1 hour.

| Lab Test | New DFC Yellow | New DFC Orange | New DFC Red | New DFC Blue | New DFC Violet | Iron oxide red |
|---|---|---|---|---|---|---|
| Dry SATRA | 5 | 5 | 5 | 5 | 5 | 5 |
| Wet SATRA | 4 | 4 | 4 | 4 | 4 | 4 |
| Wet finger | 5 | 5 | 5 | 5 | 5 | 5 |

Scale: 5 = No removal, 1 = Total removal.

In addition, inks were printed on paper, metallized paper and polyethylene film. The inks exhibited clean color on all of these substrate materials.

Safety for Direct Food Contact

Tables 12 and 13 set forth "Basis for Safety" outcomes. Along with the concentration of each substance in the printing ink, assumptions have been made regarding the dry ink coating weight, the extent of coverage of the substrate surface with an ink on a % basis, the surface area of print in contact with food, and the weight of the food. The values of the assumptions are documented. A worst-case calculation was then performed in which it is assumed that 100% of the substance in the in the ink migrates into the food. The resulting worse case calculation is then compared to the specific migration limit (SML) to arrive at a Basis for Safety outcome, which are the following possibilities:

TABLE 10

| Basis for Safety outcomes | |
|---|---|
| Worst Case Calculation < SML | If 100% of the substance migrating into the food results in a level of migration that is below the Specific Migration Limit (SML), then there is no concern; the substance is safe for direct contact with food. This approach permits the safety of many substances to be determined without the need for migration testing. |
| Worst Case Calculation > SML | If the Worst Case Calculation would result in 100% of the substance migrating into the food at a level that is above the Specific Migration Limit (SML), then the migration of the substance needs to be tested to determine whether it is safe for DFC. |
| Converter Review | |
| Converter Control | Some substances, such as solvents, are volatile and therefore evaporate during the ink drying process. Thus, the residual concentration of these substances in the dried ink film will be low. As the residual concentration of these substances is directly influenced by the actions of |

TABLE 10-continued

| Basis for Safety outcomes |
| --- |
| the converter (in how well the ink is dried), the converter can determine whether the drying process is fit for purpose. This can be done by doing a migration test for such substances. Testing on these substances finds that the amounts of same are not detectable. Thus, a converter of ordinary skill, following reasonable industry practices, will readily be able to reduce residual amounts to levels safe for DFC. |

In addition to the substance responsible for the color, many commercial products contain other chemicals (generally referred to as additives) that are present in order to improve the application properties of the product, such as the dispersibility, flow and flocculation resistance of pigments (dyes often contain significant amounts of diluents). in all cases, the essential colorant is the portion of the material responsible for the color and excludes any additives.

The following EFSA publications, which are incorporated herein by reference, were relied upon for the Threshold of Toxicological concern approach to hazard assessment developed by the European Food Safety Authority (EFSA), and in one instance, the World Health Organization (WHO):

1. EFSA Document: Outcome of the public consultation on the draft guidance on the use of the Threshold of Toxicological Concern approach in food safety assessment. APPROVED: 17 May 2019, doi:10.2903/sp.efsa.2019.EN-1661;
2. EFSA Document: Guidance on the use of the Threshold of Toxicological Concern approach in food safety assessment, ADOPTED: 24 Apr. 2019, doi: 10.2903/j.efsa.2019.5708;
3. EFSA Document: Priority topics for the development of risk assessment guidance by EFSA's Scientific Committee in 2016-2018, ADOPTED: 19 May 2016, doi: 10.2903/j.efsa.2016.4502;
4. EFSA and WHO document: Review of the Threshold of Toxicological Concern (TTC) approach and development of new TTC decision tree. PUBLISHED: 10 Mar. 2016; and
5. EFSA Document: Scientific Opinion on Exploring options for providing advice about possible human health risks based on the concept of Threshold of Toxicological Concern (TTC). EFSA Journal 2012;10(7):2750

In Europe, Specific Migration Limits (SMLs) are derived by assuming that a 60 Kg adult consumes 1 kg of food per day. Thus, by performing a calculation, it is possible to get from the mg of substance per kg bodyweight per day to the units of SML. Also, a paper straw scenario, described below, is used in this disclosure to assess safety.

Since not all consumers are 60 kg adults, conversion calculations were performed where the bodyweights of humans of different ages and weights are taken into account. An example of this calculation would be that if a substance hazard assessment showed that a particular substance had a tolerable daily intake of 0.05 mg/Kg bodyweight per day. From that information, the maximum safe limit that a 60 Kg adult who consumes 1 kg of food per day could be exposed to is 3.0 mg substance/kg food. If however the consumer is instead a 12.63 kg toddler, then the maximum safe limit would be 0.63 mg substance/kg food.

The organic pigments are not identified in Tables 11-133, as it is not the organic pigments themselves that migrate, but rather other substances (residual starting substances, impurities, additives) that are present in the pigment. The pigments identified herein contain substances for which the risk of consumption is low.

The following Tables 11-13 show how all of the materials chosen for the inks of the present invention are within the guidelines for migration, even under strict conditions and worst-case scenarios that exceed the various regulatory requirements.

Table 11 sets forth information on the substances present in the pigments and inks, including substance name, CAS number, the source of the regulation and the amount of substance permitted in food. Regulation (EU) No. 10/2011, referred to in the column headed "Restriction as per Regulation (EU) No. 10/2011 (as amended)" sets forth specific migration limits for the substances. This regulation can be accessed at: http://eur-lex.europa.eu/legal-content/EN/TXT/HTML/!uri=CELEX:32011R0010&from=EN (last visited on Jun. 23, 2020). Annex I sets forth specific migration limits for substances. Article 11 of this regulation indicates that "For substances for which no specific migration limit or other restrictions are provided in Annex I, a generic specific migration limit of 60 mg/kg shall apply".

Tables 12 and 13 set forth the migration data for adults (12) and children (13). While substances are not named in these tables, the sequence and ordering of the substances in these tables is the same as they appear in Table 11. Table 11 therefore sets forth the substance names for Tables 12 and 13.

The paper straw scenario referenced in Tables 12 and 13 is a version of the EU cube model that is adjusted for the reduced food contact area of a beverage straw. This scenario accounts for a situation in which the printed item that is in contact with food (in this case a beverage) is a paper straw, which has less contact area with food than the EU cube model, which assumes 0.06 m$^2$ of packaging covering 1 Kg of food.

Figure 6:
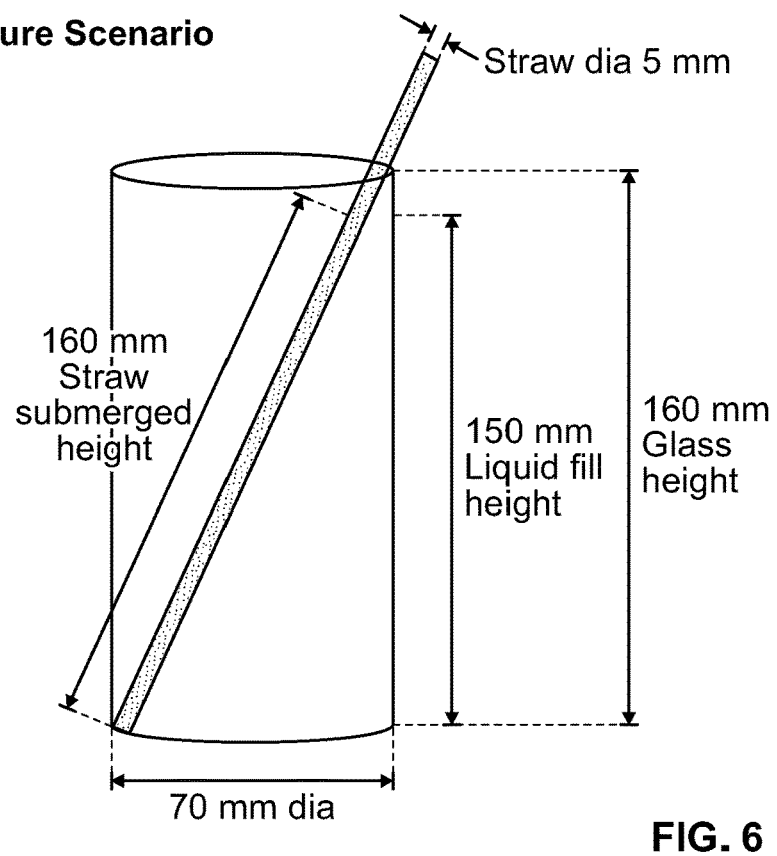
FIG. 6 illustrates the paper straw scenario.

FIG. 6 illustrates the paper straw scenario as a worst case scenario for a printed paper straw in contact with a beverage. A relatively tall and narrow glass (160 mm tall, 70 mm in diameter) is selected for the model. The glass is filled with beverage to a height of 150 mm. The straw sits diagonally within the glass to maximize surface area in contact with the beverage. The length of the straw submerged in the liquid is 160 mm.

The volume of liquid in the glass is: 35 mm$^2 \times \pi \times$150 mm=577267 mm$^3$=577.27 cm$^3$. Assuming a liquid specific gravity of 1.0, the weight of the liquid is 0.57727 Kg.

The straw used in the scenario has a 5 mm diameter. The area of straw in the liquid is: it $\pi \times$5 mm$\times$160 mm=2513 mm$^2$=0.002513 m$^2$.

Compared to the EU Cube exposure scenario of 0.06m$^2$ of packaging covering 1 Kg of food, this exposure scenario is different by a factor of: (0.06/0.002513)$\times$0.57727=13.8.

In other words, the coverage area in the paper straw scenario is 13.8 less than the coverage area in the EU cube model, and thus the values set forth for the paper straw scenario are arrived at by dividing the values for the EU cube model by 13.8.

TABLE 11

| | | | | |
|---|---|---|---|---|
| | | Migration Data | | |
| Source of the Material | Food Contact Material (FCM) No. EU Plastics Regulation 'Food Contact Materials Number' | Plastic Material (PM) Ref. No. EFSA Plastic Materials Reference number | CAS No. XXXXXXX-XX-X format | EC Substance or material name Name as per European Commission Plastics Regulation (EU) No. 10/2011 as amended. |
| Cannabis Wax | 533 | 42720 | 0008015-86-9 | carnauba wax |
| Ex. 1 DFC-TV | 206 | 11500 | 0000103-11-7 | acrylic acid, 2-ethylhexyl ester |
| Ex. 1 DFC-TV | | 37520 | 0002634-33-5 | |
| Ex. 1 DFC-TV | 515 | 95855 | 0007732-18-5 | water |
| Ex. 1 DFC-TV | 118 | 81882 | 0000067-63-0 | 2-propanol |
| Ex. 2 Yellow Base | 206 | 11500 | 0000103-11-7 | acrylic acid, 2-ethylhexyl ester |
| Ex. 2 Yellow Base | 209 | 17050 | 0000104-76-7 | 2-Ethyl-1-hexanol |
| Ex. 2 Yellow Base | | 39480 | 0000093-83-4 | |
| Ex. 2 Yellow Base | | | 0013481-50-0 | |
| Ex. 2 Yellow Base | | | 0000067-52-7 | |
| Ex. 2 Yellow Base | | | 0000085-41-6 | |
| Ex. 2 Yellow Base | | | 0006781-42-6 | |
| Ex. 2 Yellow Base | | | 0026465-81-6 | |
| Ex. 2 Yellow Base | | | 0002425-77-6 | |
| Ex. 2 Yellow Base | | | 0110225-00-8 | |
| Ex. 2 Yellow Base | 9 | 30610 | n.a. | Acids, C2-C24 aliphatic, linear. monocarboxylic from natural oils and fats and their mono-, di-, and triglycerol esters (branched fatty acids at naturally occurring levels are included). |
| Ex. 2 Yellow Base | 271 | 52720 | 0000112-84-5 | Erucamide |
| Ex. 2 Yellow Base | | 15735, 47620 | 0000111-42-2 | |
| Ex. 2 Yellow Base | 326 | 12764, 22337, 67420, 12763, 35170 | 0000141-43-5 | |
| Ex. 2 Yellow Base | 793 | 94000 | 0000102-71-6 | |
| Ex. 2 Yellow Base | | 37520 | 0002634-33-5 | |
| Ex. 2 Yellow Base | 515 | 95855 | 0007732-18-5 | water |
| Ex. 2 Yellow Base | 118 | 81882 | 0000067-63-0 | 2-propanol |
| Ex. 3 Orange Base | 206 | 11500 | 0000103-11-7 | acrylic acid, 2-ethylhexyl ester |
| Ex. 3 Orange Base | 209 | 17050 | 0000104-76-7 | 2-Ethyl-1-hexanol |
| Ex. 3 Orange Base | | | 0001740-57-4 | |
| Ex. 3 Orange Base | | | 000626-17-5 | |
| Ex. 3 Orange Base | | | 0001877-72-1 | |
| Ex. 3 Orange Base | | | 0006912-09-0 | |
| Ex. 3 Orange Base | | | 0204588-97-6 | |
| Ex. 3 Orange Base | | | 0000075-85-4 | |
| Ex. 3 Orange Base | | | 0021078-65-9 | |
| Ex. 3 Orange Base | | | 0003018-21-1 | |
| Ex. 3 Orange Base | | | 0003018-20-0 | |
| Ex. 3 Orange Base | | 37520 | 0002634-33-5 | |
| Ex. 3 Orange Base | 515 | 95855 | 0007732-18-5 | water |
| Ex. 3 Orange Base | 118 | 81882 | 0000067-63-0 | 2-propanol |
| Ex. 4 Red Base | 206 | 11500 | 0000103-11-7 | acrylic acid, 2-ethylhexyl ester |
| Ex. 4 Red Base | 209 | 17050 | 0000104-76-7 | 2-Ethyl-1-hexanol |
| Ex. 4 Red Base | | | 0000092-92-2 | |
| Ex. 4 Red Base | | | 0000104-88-1 | |
| Ex. 4 Red Base | | | 0003815-20-1 | |
| Ex. 4 Red Base | | | 0003218-36-8 | |
| Ex. 4 Red Base | | | 0002920-38-9 | |
| Ex. 4 Red Base | | | 0031274-51-8 | |
| Ex. 4 Red Base | | | No CAS | |
| Ex. 4 Red Base | | | No CAS | |
| Ex. 4 Red Base | | | 0153531-70-5 | |
| Ex. 4 Red Base | | | 0021078-65-9 | |
| Ex. 4 Red Base | | | 0003018-21-1 | |
| Ex. 4 Red Base | | | 0003018-20-0 | |
| Ex. 4 Red Base | | | 0006781-42-6 | |
| Ex. 4 Red Base | | 37520 | 0002634-33-5 | |
| Ex. 4 Red Base | 515 | 95855 | 0007732-18-5 | water |
| Ex. 4 Red Base | 118 | 81882 | 000067-63-0 | 2-propanol |
| Ex. 5 Blue Base | 206 | 11500 | 0000103-11-7 | acrylic acid, 2-ethylhexyl ester |
| Ex. 5 Blue Base | 209 | 17050 | 0000104-76-7 | 2-Ethyl-1-hexanol |
| Ex. 5 Blue Base | | | 0064742-94-5 | |

TABLE 11-continued

Migration Data

| Source | Col2 | Col3 | CAS | Name |
|---|---|---|---|---|
| Ex. 5 Blue Base | | | 0000091-20-3 | |
| Ex. 5 Blue Base | | | 0021078-65-9 | |
| Ex. 5 Blue Base | | | 0006781-42-6 | |
| Ex. 5 Blue Base | | | 0002425-77-6 | |
| Ex. 5 Blue Base | | | 0110225-00-8 | |
| Ex. 5 Blue Base | 9 | 30610 | 0000123-94-4 | Acids, C2-C24 aliphatic, linear. monocarboxylic from natural oils and fats and their mono-, di-, and triglycerol esters (branched fatty acids at naturally occurring levels are included). |
| Ex. 5 Blue Base | 271 | 52720 | 0000112-84-5 | Erucamide |
| Ex. 5 Blue Base | | 37520 | 0002634-33-5 | |
| Ex. 5 Blue Base | 515 | 95855 | 0007732-18-5 | water |
| Ex. 5 Blue Base | 118 | 81882 | 0000067-63-0 | 2-propanol |
| Ex. 6 Violet Base | 206 | 11500 | 0000103-11-7 | acrylic acid, 2-ethylhexyl ester |
| Ex. 6 Violet Base | 717 | 84420, 84210 | 0065997-06-0 | |
| Ex. 6 Violet Base | 209 | 17050 | 0000104-76-7 | 2-Ethyl-1-hexanol |
| Ex. 6 Violet Base | | | 0006781-42-6 | |
| Ex. 6 Violet Base | | | 0002425-77-6 | |
| Ex. 6 Violet Base | | | 0000120-00-3 | |
| Ex. 6 Violet Base | | | 0003908-48-3 | |
| Ex. 6 Violet Base | | | 0021078-65-9 | |
| Ex. 6 Violet Base | | | 0003018-21-1 | |
| Ex. 6 Violet Base | | | 0003018-20-0 | |
| Ex. 6 Violet Base | | | 0110225-00-8 | |
| Ex. 6 Violet Base | 9 | 30610 | 0000123-94-4 | Acids, C2-C24 aliphatic, linear. monocarboxylic from natural oils and fats and their mono-, di-, and triglycerol esters (branched fatty acids at naturally occurring levels are included). |
| Ex. 6 Violet Base | 271 | 52720 | 0000112-84-5 | Erucamide |
| Ex. 6 Violet Base | | 37520 | 0002634-33-5 | |
| Ex. 6 Violet Base | 515 | 95855 | 0007732-18-5 | water |
| Ex. 6 Violet Base | 118 | 81882 | 0000067-63-0 | 2-propanol |
| Ex. 7 Black Base | 713 | 43480 | 0007440-44-0 | charcoal, activated |
| Ex. 7 Black Base | 206 | 11500 | 0000103-11-7 | acrylic acid, 2-ethylhexyl ester |
| Ex. 7 Black Base | 209 | 17050 | 0000104-76-7 | 2-Ethyl-1-hexanol |
| Ex. 7 Black Base | | | 0021078-65-9 | |
| Ex. 7 Black Base | | 37520 | 0002634-33-5 | |
| Ex. 7 Black Base | 515 | 95855 | 0007732-18-5 | water |
| Ex. 7 Black Base | 118 | 81882 | 0000067-63-0 | 2-propanol |

| Source of the Material | Swiss FOPH Substance or material name Name as per Swiss Federal Office for Public Health (FOPH) Ordinance on Materials and Articles (SR 817.023.21) includes provisions specific to food packaging inks. | [1]Restriction as per Regulation (EU) No. 10/2011 (as amended) Mg/kg food | [2]Restriction as per Swiss Ordinance (as amended) Mg/kg | [3]SML value used for WCC Mg/kg Ranking: EU Plastics Regulation > EFSA Opinion > Provisional List of Additives used in Plastic > Swiss Ordinance |
|---|---|---|---|---|
| Cannabis Wax | carnauba wax | 60 | 60 | 60 |
| Ex. 1 DFC-TV | acrylic acid, 2-ethylhexyl ester | 0.05 | 0.05 | 0.05 |
| Ex. 1 DFC-TV | 1,2-Benzisothiazolin-3-one | | 0.5 | 0.5 |
| Ex. 1 DFC-TV | water | 60 | 60 | 60 |
| Ex. 1 DFC-TV | 2-propanol | 60 | 60 | 60 |
| Ex. 2 Yellow Base | acrylic acid, 2-ethylhexyl ester | 0.05 | 0.05 | 0.05 |
| Ex. 2 Yellow Base | 2-Ethyl-1-hexanol | 30 | 30 | 30 |
| Ex. 2 Yellow Base | N,N-Bis(2-hydroxyethyl) oleamide | | 0.01 | 5 |
| Ex. 2 Yellow Base | 2,4,6(1H,3H,5H)-Pyrimidentrione. 5-(2,3-dihydro-3-oxo-1H-isoindol-1-ylidene)- | | | 0.09 |
| Ex. 2 Yellow Base | Barbituric acid | | 0.01 | 0.09 |
| Ex. 2 Yellow Base | Phthalimide | | 0.01 | 0.09 |
| Ex. 2 Yellow Base | 1,3-Diacctylbenzene | | | 1.8 |
| Ex. 2 Yellow Base | 3,3-Dimethyl-1-indanone | | | 1.8 |

TABLE 11-continued

Migration Data

| | | | | |
|---|---|---|---|---|
| Ex. 2 Yellow Base | 2-hexyl-1-decanol | | | 5 |
| Ex. 2 Yellow Base | 2-hexyl-1-dodecanol | | | 1.8 |
| Ex. 2 Yellow Base | Acids, C2-C24 aliphatic, linear. monocarboxylic from natural oils and fats and their mono-, di-, and triglycerol esters (branched fatty acids at naturally occurring levels are included). | 60 | 60 | 60 |
| Ex. 2 Yellow Base | Erucamide | 60 | 60 | 60 |
| Ex. 2 Yellow Base | Diethanolamine | 0.3 | 0.3 | 0.3 |
| Ex. 2 Yellow Base | 2-aminoethanol | 0.05 | 0.05 | 0.05 |
| Ex. 2 Yellow Base | triethanolamine | 0.05 | 0.05 | 0.05 |
| Ex. 2 Yellow Base | 1,2-Benzisothiazolin-3-one | | 0.5 | 0.5 |
| Ex. 2 Yellow Base | water | 60 | 60 | 60 |
| Ex. 2 Yellow Base | 2-propanol | 60 | 60 | 60 |
| Ex. 3 Orange Base | acrylic acid, 2-ethylhexyl ester | 0.05 | 0.05 | 0.05 |
| Ex. 3 Orange Base | 2-Ethyl-1-hexanol | 30 | 30 | 30 |
| Ex. 3 Orange Base | 1,3-Benzenedicarboxamide | | | 0.09 |
| Ex. 3 Orange Base | 1,3-Benzenedicrabonitrile | | | 0.09 |
| Ex. 3 Orange Base | Benzoic acid, 3-cyano | | | 0.09 |
| Ex. 3 Orange Base | Benzonitrile, 3,3',3''-(1,3,5-triazine-2,4,6-triyl)tris- | | | 0.09 |
| Ex. 3 Orange Base | Benzonitrile, 4,4'-(6-methyl-2,4-pyrimidmediyl)bis- | | | 0.01 |
| Ex. 3 Orange Base | 2-Butanol, 2-methyl- | | | 0.09 |
| Ex. 3 Orange Base | 2-ethyl-1-decanol | | | 1.8 |
| Ex. 3 Orange Base | 1,2-Diphenyl-cyclobutane | | | 0.09 |
| Ex. 3 Orange Base | 1-Phenyl-1,2,3,4-tetrahydronaphthalene | | | 0.09 |
| Ex. 3 Orange Base | 1,2-Benzisothiazolin-3-one | | 0.5 | 0.5 |
| Ex. 3 Orange Base | water | 60 | 60 | 60 |
| Ex. 3 Orange Base | 2-propanol | 60 | 60 | 60 |
| Ex. 4 Red Base | acrylic acid, 2-ethylhexyl ester | 0.05 | 0.05 | 0.05 |
| Ex. 4 Red Base | 2-Ethyl-1-hexanol | 30 | 30 | 30 |
| Ex. 4 Red Base | 4-Phenylbenzole acid | | | 0.09 |
| Ex. 4 Red Base | 4-Chlorobenzaldehyde | | | 0.09 |
| Ex. 4 Red Base | 4-Phenylbenzamide (PAA) | | | 0.09 |
| Ex. 4 Red Base | 4-Phenylbenzaldehyde | | | 0.09 |
| Ex. 4 Red Base | 4-Phenylbenzonitrile | | | 0.09 |
| Ex. 4 Red Base | 1,3,5-Triazine., 2,4,6-tris([1,1'-biphenyl]-4-yl)- | | | 5 |
| Ex. 4 Red Base | 2,4,6-Tris-biphenyl-4-yl-7H-pyrrolo[2,3-d]pyrimidine-5-carboxylic acid | | | 0.01 |
| Ex. 4 Red Base | 2,4-Bisbiphenyl-4-yl-6-methyl-[1,3]pyrimidine | | | 0.09 |
| Ex. 4 Red Base | Di-isopropyl-succinyl-succinate | | | 0.54 |
| Ex. 4 Red Base | 2-ethyl-1-decanol | | | 1.8 |
| Ex. 4 Red Base | 1,2-Diphenyl-cyclobutane | | | 0.09 |
| Ex. 4 Red Base | 1-Phenyl-1,2,3,4-tretrahydronaphthalene | | | 0.09 |
| Ex. 4 Red Base | 1,3-Diacctylbenzene | | | 1.8 |
| Ex. 4 Red Base | 1,2-Benzisothiazolin-3-one | | 0.5 | 0.5 |
| Ex. 4 Red Base | water | 60 | 60 | 60 |
| Ex. 4 Red Base | 2-propanol | 60 | 60 | 60 |
| Ex. 5 Blue Base | acrylic acid, 2-ethylhexyl ester | 0.05 | 0.05 | 0.05 |
| Ex. 5 Blue Base | 2-Ethyl-1-hexanol | 30 | 30 | 30 |
| Ex. 5 Blue Base | Solvent naphtha (petroleum), heavy arom. | | 0.01 | 5 |
| Ex. 5 Blue Base | Naphthalene | | 0.01 | 0.01 |
| Ex. 5 Blue Base | 2-ethyl-1-decanol | | | 1.8 |
| Ex. 5 Blue Base | 1,3-Diacctylbenzene | | | 1.8 |
| Ex. 5 Blue Base | 2-hexyl-1-decanol | | | 5 |
| Ex. 5 Blue Base | 2-hexyl-1-dodecanol | | | 1.8 |
| Ex. 5 Blue Base | Acids, C2-C24 aliphatic, linear. monocarboxylic from natural oils and fats and their mono-, di-, and triglycerol esters (branched fatty acids at naturally occurring levels are included). | 60 | 60 | 60 |
| Ex. 5 Blue Base | Erucamide | 60 | 60 | 60 |
| Ex. 5 Blue Base | 1,2-Benzisothiazolin-3-one | | 0.5 | 0.5 |

TABLE 11-continued

Migration Data

| | | | | |
|---|---|---|---|---|
| Ex. 5 Blue Base | water | 60 | 60 | 60 |
| Ex. 5 Blue Base | 2-propanol | 60 | 60 | 60 |
| Ex. 6 Violet Base | acrylic acid, 2-ethylhexyl ester | 0.05 | 0.05 | 0.05 |
| Ex. 6 Violet Base | Rosin, hydrogenated | 60 | 60 | 60 |
| Ex. 6 Violet Base | 2-Ethyl-1-hexanol | 30 | 30 | 30 |
| Ex. 6 Violet Base | 1,3-Diacctylbenzene | | | 1.8 |
| Ex. 6 Violet Base | 2-hexyl-1-decanol | | | 5 |
| Ex. 6 Violet Base | 4'-amino-2',5'-diethoxybenzanilide | | | 0.09 |
| Ex. 6 Violet Base | 2,5-Diamino-3,6-dichloro-benzochinone | | | 0.00015 |
| Ex. 6 Violet Base | 2-ethyl-1-decanol | | | 1.8 |
| Ex. 6 Violet Base | 1,2-Diphenyl-cyclobutane | | | 0.09 |
| Ex. 6 Violet Base | 1-Phenyl-1,2,3,4-tretrahydronaphthalene | | | 0.09 |
| Ex. 6 Violet Base | 2-hexyl-1-dodecanol | | | 1.8 |
| Ex. 6 Violet Base | Acids, C2-C24 aliphatic, linear. monocarboxylic from natural oils and fats and their mono-, di-, and triglycerol esters (branched fatty acids at naturally occurring levels are included). | 60 | 60 | 60 |
| Ex. 6 Violet Base | Erucamide | 60 | 60 | 60 |
| Ex. 6 Violet Base | 1,2-Benzisothiazolin-3-one | | 0.5 | 0.5 |
| Ex. 6 Violet Base | water | 60 | 60 | 60 |
| Ex. 6 Violet Base | 2-propanol | 60 | 60 | 60 |
| Ex. 7 Black Base | charcoal, activated | 60 | 60 | 60 |
| Ex. 7 Black Base | acrylic acid, 2-ethylhexyl ester | 0.05 | 0.05 | 0.05 |
| Ex. 7 Black Base | 2-Ethyl-1-hexanol | 30 | 30 | 30 |
| Ex. 7 Black Base | 2-ethyl-1-decanol | | | 1.8 |
| Ex. 7 Black Base | 1,2-Benzisothiazolin-3-one | | 0.5 | 0.5 |
| Ex. 7 Black Base | water | 60 | 60 | 60 |
| Ex. 7 Black Base | 2-propanol | 60 | 60 | 60 |

[1]Maximum amount permitted according to regulation; [2]Maximum amount permitted according to regulation; [3]SML = Specific migration limit, the maximum amount permitted according to Sun patent methodology (based on USA hazard assessment process)

TABLE 12

Migration Data

| Source of the Material | [4]Source of restriction / SML used | [5]% of the substance in the dry product | [6]Maximum % of SML (mg/kg) for EU Cube (Adult—60 kg) | [7]Basis for Safety Please refer to the explanation given above |
|---|---|---|---|---|
| Cannabis Wax | PR | 75-100 | 200 | Worst Case Calculation > SML— Converter review |
| Ex. 1 DFC-TV | PR | <0.1 | 160 | Worst Case Calculation > SML— Converter review |
| Ex. 1 DFC-TV | SO | <0.1 | 6 | Worst Case Calculation < SML |
| Ex. 1 DFC-TV | PR | Converter Control | Converter Control | Converter Control |
| Ex. 1 DFC-TV | PR | Converter Control | Converter Control | Converter Control |
| Ex. 1 DFC-TV | PR | <0.1 | 110 | Worst Case Calculation > SML— Converter review |
| Ex. 2 Yellow Base | PR | <0.1 | 0.2 | Worst Case Calculation < SML |
| Ex. 2 Yellow Base | HA | 1-10 | 59 | Worst Case Calculation < SML |

TABLE 12-continued

Migration Data

| | | | | |
|---|---|---|---|---|
| Ex. 2 Yellow Base | HA | 1-10 | 3300 | Worst Case Calculation < SML—Converter review |
| Ex. 2 Yellow Base | HA | 0.1-1 | 1100 | Worst Case Calculation > SML— Converter review |
| Ex. 2 Yellow Base | HA | 0.1-1 | 730 | Worst Case Calculation > SML— Converter review |
| Ex. 2 Yellow Base | HA | <0.1 | 9 | Worst Case Calculation < SML |
| Ex. 2 Yellow Base | HA | <0.1 | 0.4 | Worst Case Calculation < SML |
| Ex. 2 Yellow Base | HA | <0.1 | 0.9 | Worst Case Calculation < SML |
| Ex. 2 Yellow Base | HA | <0.1 | 3 | Worst Case Calculation < SML |
| Ex. 2 Yellow Base | PR | <0.1 | 36 | Worst Case Calculation < SML |
| Ex. 2 Yellow Base | PR | <0.1 | 8 | Worst Case Calculation < SML |
| Ex. 2 Yellow Base | PR | 0.1-1 | 66 | Worst Case Calculation < SML |
| Ex. 2 Yellow Base | PR | <0.1 | 2 | Worst Case Calculation < SML |
| Ex. 2 Yellow Base | PR | <0.1 | 2 | Worst Case Calculation < SML |
| Ex. 2 Yellow Base | SO | <0.1 | 4 | Worst Case Calculation < SML |
| Ex. 2 Yellow Base | PR | Converter Control | Converter Control | Converter Control |
| Ex. 2 Yellow Base | PR | Converter Control | Converter Control | Converter Control |
| Ex. 3 Orange Base | PR | <0.1 | 120 | Worst Case Calculation > SML—Converter review |
| Ex. 3 Orange Base | PR | <0.1 | 0.4 | Worst Case Calculation < SML |
| Ex. 3 Orange Base | HA | <0.1 | 14 | Worst Case Calculation < SML |
| Ex. 3 Orange Base | HA | <0.1 | 3 | Worst Case Calculation < SML |
| Ex. 3 Orange Base | HA | <0.1 | 18 | Worst Case Calculation < SML |
| Ex. 3 Orange Base | HA | <0.1 | 0.5 | Worst Case Calculation < SML |
| Ex. 3 Orange Base | Default | <0.1 | 330 | Worst Case Calculation < SML |
| Ex. 3 Orange Base | HA | <0.1 | 0.4 | Worst Case Calculation < SML |
| Ex. 3 Orange Base | HA | <0.1 | 0.6 | Worst Case Calculation < SML |
| Ex. 3 Orange Base | HA | <0.1 | 12 | Worst Case Calculation < SML |

TABLE 12-continued

| | | Migration Data | | |
|---|---|---|---|---|
| Ex. 3 Orange Base | HA | <0.1 | 12 | Worst Case Calculation < SML |
| Ex. 3 Orange Base | SO | <0.1 | 5 | Worst Case Calculation < SML |
| Ex. 3 Orange Base | PR | Converter Control | Converter Control | Converter Control |
| Ex. 3 Orange Base | PR | Converter Control | Converter Control | Converter Control |
| Ex. 4 Red Base | PR | <0.1 | 96 | Worst Case Calculation < SML |
| Ex. 4 Red Base | PR | <0.1 | 0.4 | Worst Case Calculation < SML |
| Ex. 4 Red Base | HA | <0.1 | 8 | Worst Case Calculation < SML |
| Ex. 4 Red Base | HA | <0.1 | 15 | Worst Case Calculation < SML |
| Ex. 4 Red Base | HA | 0.1-1 | 250 | Worst Case Calculation > SML—Converter review |
| Ex. 4 Red Base | HA | <0.1 | 1 | Worst Case Calculation < SML |
| Ex. 4 Red Base | HA | <0.1 | 5 | Worst Case Calculation < SML |
| Ex. 4 Red Base | HA | <0.1 | 0.3 | Worst Case Calculation < SML |
| Ex. 4 Red Base | Default | <0.1 | 450 | Worst Case Calculation < SML |
| Ex. 4 Red Base | HA | <0.1 | 3 | Worst Case Calculation < SML |
| Ex. 4 Red Base | HA | <0.1 | 0.9 | Worst Case Calculation < SML |
| Ex. 4 Red Base | HA | <0.1 | 0.6 | Worst Case Calculation < SML |
| Ex. 4 Red Base | HA | <0.1 | 12 | Worst Case Calculation < SML |
| Ex. 4 Red Base | HA | <0.1 | 12 | Worst Case Calculation < SML |
| Ex. 4 Red Base | HA | <0.1 | 0.6 | Worst Case Calculation < SML |
| Ex. 4 Red Base | SO | <0.1 | 4 | Worst Case Calculation < SML |
| Ex. 4 Red Base | PR | Converter Control | Converter Control | Converter Control |
| Ex. 4 Red Base | PR | Converter Control | Converter Control | Converter Control |
| Ex. 5 Blue Base | PR | <0.1 | 96 | Worst Case Calculation < SML |
| Ex. 5 Blue Base | PR | <0.1 | 0.4 | Worst Case Calculation < SML |
| Ex. 5 Blue Base | HA | <0.1 | 0.6 | Worst Case Calculation < SML |
| Ex. 5 Blue Base | SO | <0.1 | 0.5 | Worst Case Calculation < SML |
| Ex. 5 Blue Base | HA | <0.1 | 0.6 | Worst Case Calculation < SML |

TABLE 12-continued

Migration Data

| | | | | |
|---|---|---|---|---|
| Ex. 5 Blue Base | HA | <0.1 | 3 | Worst Case Calculation < SML |
| Ex. 5 Blue Base | HA | <0.1 | 0.2 | Worst Case Calculation < SML |
| Ex. 5 Blue Base | HA | <0.1 | 3 | Worst Case Calculation < SML |
| Ex. 5 Blue Base | PR | <0.1 | 4 | Worst Case Calculation < SML |
| Ex. 5 Blue Base | PR | <0.1 | 2 | Worst Case Calculation < SML |
| Ex. 5 Blue Base | SO | <0.1 | 4 | Worst Case Calculation < SML |
| Ex. 5 Blue Base | PR | Converter Control | Converter Control | Converter Control |
| Ex. 5 Blue Base | PR | Converter Control | Converter Control | Converter Control |
| Ex. 6 Violet Base | PR | <0.1 | 96 | Worst Case Calculation < SML |
| Ex. 6 Violet Base | PR | 1-16 | 6 | Worst Case Calculation < SML |
| Ex. 6 Violet Base | PR | <0.1 | 0.3 | Worst Case Calculation < SML |
| Ex. 6 Violet Base | HA | <0.1 | 2 | Worst Case Calculation < SML |
| Ex. 6 Violet Base | HA | <0.1 | 0.2 | Worst Case Calculation < SML |
| Ex. 6 Violet Base | HA | <0.1 | 0.1 | Worst Case Calculation < SML |
| Ex. 6 Violet Base | HA | <0.1 | 30 | Worst Case Calculation < SML |
| Ex. 6 Violet Base | HA | <0.1 | 0.6 | Worst Case Calculation < SML |
| Ex. 6 Violet Base | HA | <0.1 | 12 | Worst Case Calculation < SML |
| Ex. 6 Violet Base | HA | <0.1 | 12 | Worst Case Calculation < SML |
| Ex. 6 Violet Base | HA | <0.1 | 0.6 | Worst Case Calculation < SML |
| Ex. 6 Violet Base | PR | <0.1 | 0.5 | Worst Case Calculation < SML |
| Ex. 6 Violet Base | PR | <0.1 | 0.5 | Worst Case Calculation < SML |
| Ex. 6 Violet Base | SO | <0.1 | 4 | Worst Case Calculation < SML |
| Ex. 6 Violet Base | PR | Converter Control | Converter Control | Converter Control |
| Ex. 6 Violet Base | PR | Converter Control | Converter Control | Converter Control |
| Ex. 7 Black Base | PR | 25-50 | 74 | Worst Case Calculation < SML |
| Ex. 7 Black Base | PR | <0.1 | 96 | Worst Case Calculation < SML |
| Ex. 7 Black Base | PR | <0.1 | 0.6 | Worst Case Calculation < SML |

TABLE 12-continued

| | | Migration Data | | |
|---|---|---|---|---|
| Ex. 7 Black Base | HA | <0.1 | 0.6 | Worst Case Calculation < SML |
| Ex. 7 Black Base | SO | <0.1 | 4 | Worst Case Calculation < SML |
| Ex. 7 Black Base | PR | Converter Control | Converter Control | Converter Control |
| Ex. 7 Black Base | PR | Converter Control | Converter Control | Converter Control |

| Source of the Material | [6]Maximum % of SML mg/kg adjusted for paper straw (Adult—60 kg) This number is obtained by dividing Maximum % of SML (mg/kg) for EU Cube by the paper straw model factor (13.8) | [7]Basis for Safety | [8]Maximum % of SML (mg/kg) adjusted for paper straw (Adult—70.26 kg) | [7]Basis for Safety |
|---|---|---|---|---|
| Cannabis Wax | 200/13.8 = 15 | Worst Case Calculation < SML | 12 | Worst Case Calculation < SML |
| Ex. 1 DFC-TV | 12 | Worst Case Calculation < SML | 10 | Worst Case Calculation < SML |
| Ex. 1 DFC-TV | 0 | Worst Case Calculation < SML | 0 | Worst Case Calculation < SML |
| Ex. 1 DFC-TV | Converter Control | Converter Control | Converter Control | Converter Control |
| Ex. 1 DFC-TV | Converter Control | Converter Control | Converter Control | Converter Control |
| Ex. 1 DFC-TV | 8 | Worst Case Calculation < SML | 7 | Worst Case Calculation < SML |
| Ex. 2 Yellow Base | 0 | Worst Case Calculation < SML | 0 | Worst Case Calculation < SML |
| Ex. 2 Yellow Base | 4 | Worst Case Calculation < SML | 4 | Worst Case Calculation < SML |
| Ex. 2 Yellow Base | 239 | Worst Case Calculation < SML—Converter Review | 205 | Worst Case Calculation < SML—Converter Review |
| Ex. 2 Yellow Base | 80 | Worst Case Calculation < SML | 68 | Worst Case Calculation < SML |
| Ex. 2 Yellow Base | 53 | Worst Case Calculation < SML | 45 | Worst Case Calculation < SML |
| Ex. 2 Yellow Base | 1 | Worst Case Calculation < SML | 1 | Worst Case Calculation < SML |
| Ex. 2 Yellow Base | 0 | Worst Case Calculation < SML | 0 | Worst Case Calculation < SML |
| Ex. 2 Yellow Base | 0 | Worst Case Calculation < SML | 0 | Worst Case Calculation < SML |
| Ex. 2 Yellow Base | 0 | Worst Case Calculation < SML | 0 | Worst Case Calculation < SML |
| Ex. 2 Yellow Base | 3 | Worst Case Calculation < SML | 2 | Worst Case Calculation < SML |
| Ex. 2 Yellow Base | 1 | Worst Case Calculation < SML | 0 | Worst Case Calculation < SML |
| Ex. 2 Yellow Base | 5 | Worst Case Calculation < SML | 4 | Worst Case Calculation < SML |
| Ex. 2 Yellow Base | 0 | Worst Case Calculation < SML | 0 | Worst Case Calculation < SML |

TABLE 12-continued

Migration Data

| | | | | |
|---|---|---|---|---|
| Ex. 2 Yellow Base | 0 | Worst Case Calculation < SML | 0 | Worst Case Calculation < SML |
| Ex. 2 Yellow Base | 0 | Worst Case Calculation < SML | 0 | Worst Case Calculation < SML |
| Ex. 2 Yellow Base | Converter Control | Converter Control | Converter Control | Converter Control |
| Ex. 2 Yellow Base | Converter Control | Converter Control | Converter Control | Converter Control |
| Ex. 3 Orange Base | 9 | Worst Case Calculation < SML | 7 | Worst Case Calculation < SML |
| Ex. 3 Orange Base | 0 | Worst Case Calculation < SML | 0 | Worst Case Calculation < SML |
| Ex. 3 Orange Base | 1 | Worst Case Calculation < SML | 1 | Worst Case Calculation < SML |
| Ex. 3 Orange Base | 0 | Worst Case Calculation < SML | 0 | Worst Case Calculation < SML |
| Ex. 3 Orange Base | 1 | Worst Case Calculation < SML | 1 | Worst Case Calculation < SML |
| Ex. 3 Orange Base | 0 | Worst Case Calculation < SML | 0 | Worst Case Calculation < SML |
| Ex. 3 Orange Base | 24 | Worst Case Calculation < SML | 20 | Worst Case Calculation < SML |
| Ex. 3 Orange Base | 0 | Worst Case Calculation < SML | 0 | Worst Case Calculation < SML |
| Ex. 3 Orange Base | 0 | Worst Case Calculation < SML | 0 | Worst Case Calculation < SML |
| Ex. 3 Orange Base | 1 | Worst Case Calculation < SML | 1 | Worst Case Calculation < SML |
| Ex. 3 Orange Base | 1 | Worst Case Calculation < SML | 1 | Worst Case Calculation < SML |
| Ex. 3 Orange Base | 0 | Worst Case Calculation < SML | 0 | Worst Case Calculation < SML |
| Ex. 3 Orange Base | Converter Control | Converter Control | Converter Control | Converter Control |
| Ex. 3 Orange Base | Converter Control | Converter Control | Converter Control | Converter Control |
| Ex. 4 Red Base | 7 | Worst Case Calculation < SML | 6 | Worst Case Calculation < SML |
| Ex. 4 Red Base | 0 | Worst Case Calculation < SML | 0 | Worst Case Calculation < SML |
| Ex. 4 Red Base | 1 | Worst Case Calculation < SML | 0 | Worst Case Calculation < SML |
| Ex. 4 Red Base | 1 | Worst Case Calculation < SML | 1 | Worst Case Calculation < SML |
| Ex. 4 Red Base | 18 | Worst Case Calculation < SML | 15 | Worst Case Calculation < SML |
| Ex. 4 Red Base | 0 | Worst Case Calculation < SML | 0 | Worst Case Calculation < SML |
| Ex. 4 Red Base | 0 | Worst Case Calculation < SML | 0 | Worst Case Calculation < SML |
| Ex. 4 Red Base | 0 | Worst Case Calculation < SML | 0 | Worst Case Calculation < SML |
| Ex. 4 Red Base | 33 | Worst Case Calculation < SML | 28 | Worst Case Calculation < SML |

TABLE 12-continued

| Migration Data | | | | |
|---|---|---|---|---|
| Ex. 4 Red Base | 0 | Worst Case Calculation < SML | 0 | Worst Case Calculation < SML |
| Ex. 4 Red Base | 0 | Worst Case Calculation < SML | 0 | Worst Case Calculation < SML |
| Ex. 4 Red Base | 0 | Worst Case Calculation < SML | 0 | Worst Case Calculation < SML |
| Ex. 4 Red Base | 1 | Worst Case Calculation < SML | 1 | Worst Case Calculation < SML |
| Ex. 4 Red Base | 1 | Worst Case Calculation < SML | 1 | Worst Case Calculation < SML |
| Ex. 4 Red Base | 0 | Worst Case Calculation < SML | 0 | Worst Case Calculation < SML |
| Ex. 4 Red Base | 0 | Worst Case Calculation < SML | 0 | Worst Case Calculation < SML |
| Ex. 4 Red Base | Converter Control | Converter Control | Converter Control | Converter Control |
| Ex. 4 Red Base | Converter Control | Converter Control | Converter Control | Converter Control |
| Ex. 5 Blue Base | 7 | Worst Case Calculation < SML | 6 | Worst Case Calculation < SML |
| Ex. 5 Blue Base | 0 | Worst Case Calculation < SML | 0 | Worst Case Calculation < SML |
| Ex. 5 Blue Base | 0 | Worst Case Calculation < SML | 0 | Worst Case Calculation < SML |
| Ex. 5 Blue Base | 0 | Worst Case Calculation < SML | 0 | Worst Case Calculation < SML |
| Ex. 5 Blue Base | 0 | Worst Case Calculation < SML | 0 | Worst Case Calculation < SML |
| Ex. 5 Blue Base | 0 | Worst Case Calculation < SML | 0 | Worst Case Calculation < SML |
| Ex. 5 Blue Base | 0 | Worst Case Calculation < SML | 0 | Worst Case Calculation < SML |
| Ex. 5 Blue Base | 0 | Worst Case Calculation < SML | 0 | Worst Case Calculation < SML |
| Ex. 5 Blue Base | 0 | Worst Case Calculation < SML | 0 | Worst Case Calculation < SML |
| Ex. 5 Blue Base | 0 | Worst Case Calculation < SML | 0 | Worst Case Calculation < SML |
| Ex. 5 Blue Base | 0 | Worst Case Calculation < SML | 0 | Worst Case Calculation < SML |
| Ex. 5 Blue Base | Converter Control | Converter Control | Converter Control | Converter Control |
| Ex. 5 Blue Base | Converter Control | Converter Control | Converter Control | Converter Control |
| Ex. 6 Violet Base | 7 | Worst Case Calculation < SML | 6 | Worst Case Calculation < SML |
| Ex. 6 Violet Base | 0 | Worst Case Calculation < SML | 0 | Worst Case Calculation < SML |
| Ex. 6 Violet Base | 0 | Worst Case Calculation < SML | 0 | Worst Case Calculation < SML |
| Ex. 6 Violet Base | 0 | Worst Case Calculation < SML | 0 | Worst Case Calculation < SML |
| Ex. 6 Violet Base | 0 | Worst Case Calculation < SML | 0 | Worst Case Calculation < SML |

TABLE 12-continued

| Migration Data | | | | |
|---|---|---|---|---|
| Ex. 6 Violet Base | 0 | Worst Case Calculation < SML | 0 | Worst Case Calculation < SML |
| Ex. 6 Violet Base | 2 | Worst Case Calculation < SML | 2 | Worst Case Calculation < SML |
| Ex. 6 Violet Base | 0 | Worst Case Calculation < SML | 0 | Worst Case Calculation < SML |
| Ex. 6 Violet Base | 1 | Worst Case Calculation < SML | 1 | Worst Case Calculation < SML |
| Ex. 6 Violet Base | 1 | Worst Case Calculation < SML | 1 | Worst Case Calculation < SML |
| Ex. 6 Violet Base | 0 | Worst Case Calculation < SML | 0 | Worst Case Calculation < SML |
| Ex. 6 Violet Base | 0 | Worst Case Calculation < SML | 0 | Worst Case Calculation < SML |
| Ex. 6 Violet Base | 0 | Worst Case Calculation < SML | 0 | Worst Case Calculation < SML |
| Ex. 6 Violet Base | 0 | Worst Case Calculation < SML | 0 | Worst Case Calculation < SML |
| Ex. 6 Violet Base | Converter Control | Converter Control | Converter Control | Converter Control |
| Ex. 6 Violet Base | Converter Control | Converter Control | Converter Control | Converter Control |
| Ex. 7 Black Base | 5 | Worst Case Calculation < SML | 5 | Worst Case Calculation < SML |
| Ex. 7 Black Base | 7 | Worst Case Calculation < SML | 6 | Worst Case Calculation < SML |
| Ex. 7 Black Base | 0 | Worst Case Calculation < SML | 0 | Worst Case Calculation < SML |
| Ex. 7 Black Base | 0 | Worst Case Calculation < SML | 0 | Worst Case Calculation < SML |
| Ex. 7 Black Base | 0 | Worst Case Calculation < SML | 0 | Worst Case Calculation < SML |
| Ex. 7 Black Base | Converter Control | Converter Control | Converter Control | Converter Control |
| Ex. 7 Black Base | Converter Control | Converter Control | Converter Control | Converter Control |

[4]Where retriction was derived from; [5]% of material in the dried coating; [6]maximum of material that could migrate based on 100% migration, paper straw scenario (shown below), adult 60 kg; [7]Basis for Safety—Worst Case Calculation is based on 100% migration; Converter Control means that this determination, would be based on the processing (printing, drying, etc.) of the end user and is not controlled by the ink manufacturer; [8]maximum of material that could migrate based on 100% migration, paper straw scenario, adult 70.26 kg.
PR = Plastics Regulation / EFSA = EFSA Opinion / SO = FPOH Swiss Ordinance / Derived = Calculated from recognized data set using EFSA principles / Default = 10 ppb / HA = internal hazard assessment
This number is obtained by dividing Maximum % of SML (mg/kg) for EU cube by the paper straw model factor (13.8)

TABLE 13

Migration Data (Table 11 Determinations for Children).

| Source of Material | [10]Maximum % of SML mg/kg adjusted for paper straw scenario (Adolescent—40.67 kg) | Basis for Safety | [11]Maximum % of SML mg/kg adjusted for paper straw scenario (Child—20.90 kg) | Basis for Safety |
|---|---|---|---|---|
| Carnauba Wax | 19 | Worst Case Calculation < SML | 42 | Worst Case Calculation < SML |
| Ex. 1 DFC-TV | 15 | Worst Case Calculation < SML | 33 | Worst Case Calculation < SML |
| Ex. 1 DFC-TV | 1 | Worst Case Calculation < SML | 1 | Worst Case Calculation < SML |

TABLE 13-continued

Migration Data (Table 11 Determinations for Children).

| | | | | |
|---|---|---|---|---|
| Ex. 1 DFC-TV | Converter Control | Converter Control | Converter Control | Converter Control |
| Ex. 1 DFC-TV | Converter Control | Converter Control | Converter Control | Converter Control |
| Ex. 2 Yellow Base | 10 | Worst Case Calculation < SML | 23 | Worst Case Calculation < SML |
| Ex. 2 Yellow Base | 0 | Worst Case Calculation < SML | 0 | Worst Case Calculation < SML |
| Ex. 2 Yellow Base | 6 | Worst Case Calculation < SML | 12 | Worst Case Calculation < SML |
| Ex. 2 Yellow Base | 309 | Worst Case Calculation > SML—Converter Review | 687 | Worst Case Calculation > SML—Converter Review |
| Ex. 2 Yellow Base | 103 | Worst Case Calculation > SML—Converter Review | 229 | Worst Case Calculation > SML—Converter Review |
| Ex. 2 Yellow Base | 68 | Worst Case Calculation > SML—Converter Review | 152 | Worst Case Calculation > SML—Converter Review |
| Ex. 2 Yellow Base | 1 | Worst Case Calculation < SML | 2 | Worst Case Calculation < SML |
| Ex. 2 Yellow Base | 0 | Worst Case Calculation < SML | 0 | Worst Case Calculation < SML |
| Ex. 2 Yellow Base | 0 | Worst Case Calculation < SML | 0 | Worst Case Calculation < SML |
| Ex. 2 Yellow Base | 0 | Worst Case Calculation < SML | 1 | Worst Case Calculation < SML |
| Ex. 2 Yellow Base | 3 | Worst Case Calculation < SML | 7 | Worst Case Calculation < SML |
| Ex. 2 Yellow Base | 1 | Worst Case Calculation < SML | 2 | Worst Case Calculation < SML |
| Ex. 2 Yellow Base | 6 | Worst Case Calculation < SML | 14 | Worst Case Calculation < SML |
| Ex. 2 Yellow Base | 0 | Worst Case Calculation < SML | 0 | Worst Case Calculation < SML |
| Ex. 2 Yellow Base | 0 | Worst Case Calculation < SML | 0 | Worst Case Calculation < SML |
| Ex. 2 Yellow Base | 0 | Worst Case Calculation < SML | 1 | Worst Case Calculation < SML |
| Ex. 2 Yellow Base | Converter Control | Converter Control | Converter Control | Converter Control |
| Ex. 2 Yellow Base | Converter Control | Converter Control | Converter Control | Converter Control |
| Ex. 3 Orange Base | 11 | Worst Case Calculation < SML | 25 | Worst Case Calculation < SML |
| Ex. 3 Orange Base | 0 | Worst Case Calculation < SML | 0 | Worst Case Calculation < SML |
| Ex. 3 Orange Base | 1 | Worst Case Calculation < SML | 3 | Worst Case Calculation < SML |
| Ex. 3 Orange Base | 0 | Worst Case Calculation < SML | 1 | Worst Case Calculation < SML |
| Ex. 3 Orange Base | 2 | Worst Case Calculation < SML | 4 | Worst Case Calculation < SML |
| Ex. 3 Orange Base | 0 | Worst Case Calculation < SML | 0 | Worst Case Calculation < SML |
| Ex. 3 Orange Base | 31 | Worst Case Calculation < SML | 69 | Worst Case Calculation < SML |

TABLE 13-continued

Migration Data (Table 11 Determinations for Children).

| | | | | |
|---|---|---|---|---|
| Ex. 3 Orange Base | 0 | Worst Case Calculation < SML | 0 | Worst Case Calculation < SML |
| Ex. 3 Orange Base | 0 | Worst Case Calculation < SML | 0 | Worst Case Calculation < SML |
| Ex. 3 Orange Base | 1 | Worst Case Calculation < SML | 2 | Worst Case Calculation < SML |
| Ex. 3 Orange Base | 1 | Worst Case Calculation < SML | 2 | Worst Case Calculation < SML |
| Ex. 3 Orange Base | 0 | Worst Case Calculation < SML | 1 | Worst Case Calculation < SML |
| Ex. 3 Orange Base | Converter Control | Converter Control | Converter Control | Converter Control |
| Ex. 3 Orange Base | Converter Control | Converter Control | Converter Control | Converter Control |
| Ex. 4 Red Base | 9 | Worst Case Calculation < SML | 20 | Worst Case Calculation < SML |
| Ex. 4 Red Base | 0 | Worst Case Calculation < SML | 0 | Worst Case Calculation < SML |
| Ex. 4 Red Base | 1 | Worst Case Calculation < SML | 2 | Worst Case Calculation < SML |
| Ex. 4 Red Base | 1 | Worst Case Calculation < SML | 3 | Worst Case Calculation < SML |
| Ex. 4 Red Base | 23 | Worst Case Calculation < SML | 52 | Worst Case Calculation < SML |
| Ex. 4 Red Base | 0 | Worst Case Calculation < SML | 0 | Worst Case Calculation < SML |
| Ex. 4 Red Base | 0 | Worst Case Calculation < SML | 1 | Worst Case Calculation < SML |
| Ex. 4 Red Base | 0 | Worst Case Calculation < SML | 0 | Worst Case Calculation < SML |
| Ex. 4 Red Base | 42 | Worst Case Calculation < SML | 94 | Worst Case Calculation < SML |
| Ex. 4 Red Base | 0 | Worst Case Calculation < SML | 1 | Worst Case Calculation < SML |
| Ex. 4 Red Base | 0 | Worst Case Calculation < SML | 0 | Worst Case Calculation < SML |
| Ex. 4 Red Base | 0 | Worst Case Calculation < SML | 0 | Worst Case Calculation < SML |
| Ex. 4 Red Base | 1 | Worst Case Calculation < SML | 2 | Worst Case Calculation < SML |
| Ex. 4 Red Base | 1 | Worst Case Calculation < SML | 2 | Worst Case Calculation < SML |
| Ex. 4 Red Base | 0 | Worst Case Calculation < SML | 0 | Worst Case Calculation < SML |
| Ex. 4 Red Base | 0 | Worst Case Calculation < SML | 1 | Worst Case Calculation < SML |
| Ex. 4 Red Base | Converter Control | Converter Control | Converter Control | Converter Control |
| Ex. 4 Red Base | Converter Control | Converter Control | Converter Control | Converter Control |
| Ex. 5 Blue Base | 9 | Worst Case Calculation < SML | 20 | Worst Case Calculation < SML |
| Ex. 5 Blue Base | 0 | Worst Case Calculation < SML | 0 | Worst Case Calculation < SML |
| Ex. 5 Blue Base | 0 | Worst Case Calculation < SML | 0 | Worst Case Calculation < SML |

TABLE 13-continued

Migration Data (Table 11 Determinations for Children).

| | | | | |
|---|---|---|---|---|
| Ex. 5 Blue Base | 0 | Worst Case Calculation < SML | 0 | Worst Case Calculation < SML |
| Ex. 5 Blue Base | 0 | Worst Case Calculation < SML | 0 | Worst Case Calculation < SML |
| Ex. 5 Blue Base | 0 | Worst Case Calculation < SML | 1 | Worst Case Calculation < SML |
| Ex. 5 Blue Base | 0 | Worst Case Calculation < SML | 0 | Worst Case Calculation < SML |
| Ex. 5 Blue Base | 0 | Worst Case Calculation < SML | 1 | Worst Case Calculation < SML |
| Ex. 5 Blue Base | 0 | Worst Case Calculation < SML | 1 | Worst Case Calculation < SML |
| Ex. 5 Blue Base | 0 | Worst Case Calculation < SML | 0 | Worst Case Calculation < SML |
| Ex. 5 Blue Base | 0 | Worst Case Calculation < SML | 1 | Worst Case Calculation < SML |
| Ex. 5 Blue Base | Converter Control | Converter Control | Converter Control | Converter Control |
| Ex. 5 Blue Base | Converter Control | Converter Control | Converter Control | Converter Control |
| Ex. 6 Violet Base | 9 | Worst Case Calculation < SML | 20 | Worst Case Calculation < SML |
| Ex. 6 Violet Base | 1 | Worst Case Calculation < SML | 1 | Worst Case Calculation < SML |
| Ex. 6 Violet Base | 0 | Worst Case Calculation < SML | 0 | Worst Case Calculation < SML |
| Ex. 6 Violet Base | 0 | Worst Case Calculation < SML | 0 | Worst Case Calculation < SML |
| Ex. 6 Violet Base | 0 | Worst Case Calculation < SML | 0 | Worst Case Calculation < SML |
| Ex. 6 Violet Base | 0 | Worst Case Calculation < SML | 0 | Worst Case Calculation < SML |
| Ex. 6 Violet Base | 3 | Worst Case Calculation < SML | 6 | Worst Case Calculation < SML |
| Ex. 6 Violet Base | 0 | Worst Case Calculation < SML | 0 | Worst Case Calculation < SML |
| Ex. 6 Violet Base | 1 | Worst Case Calculation < SML | 2 | Worst Case Calculation < SML |
| Ex. 6 Violet Base | 1 | Worst Case Calculation < SML | 2 | Worst Case Calculation < SML |
| Ex. 6 Violet Base | 0 | Worst Case Calculation < SML | 0 | Worst Case Calculation < SML |
| Ex. 6 Violet Base | 0 | Worst Case Calculation < SML | 0 | Worst Case Calculation < SML |
| Ex. 6 Violet Base | 0 | Worst Case Calculation < SML | 0 | Worst Case Calculation < SML |
| Ex. 6 Violet Base | 0 | Worst Case Calculation < SML | 1 | Worst Case Calculation < SML |
| Ex. 6 Violet Base | Converter Control | Converter Control | Converter Control | Converter Control |
| Ex. 6 Violet Base | Converter Control | Converter Control | Converter Control | Converter Control |
| Ex. 7 Black Base | 7 | Worst Case Calculation < SML | 15 | Worst Case Calculation < SML |
| Ex. 7 Black Base | 9 | Worst Case Calculation < SML | 20 | Worst Case Calculation < SML |

TABLE 13-continued

Migration Data (Table 11 Determinations for Children).

| | | | | |
|---|---|---|---|---|
| Ex. 7 Black Base | 0 | Worst Case Calculation < SML | 0 | Worst Case Calculation < SML |
| Ex. 7 Black Base | 0 | Worst Case Calculation < SML | 0 | Worst Case Calculation < SML |
| Ex. 7 Black Base | 0 | Worst Case Calculation < SML | 1 | Worst Case Calculation < SML |
| Ex. 7 Black Base | Converter Control | Converter Control | Converter Control | Converter Control |

| Source of Material | [12]Maximum % of SML mg/kg adjusted for paper straw scenario (Toddler—12.63 kg | Basis for Safety | Additional Sun Chemical Comment |
|---|---|---|---|
| Carnauba Wax | 60 | Worst Case Calculation < SML | WCC high since it is a press-side additive, not a 100% finished ink. Typical addition level no greater than 2%. |
| Ex. 1 DFC-TV | 55 | Worst Case Calculation < SML | Migration test results from Sun Rochdale analytical proved this was below 0.01 mg/Kg food. |
| Ex. 1 DFC-TV | 2 | Worst Case Calculation < SML | |
| Ex. 1 DFC-TV | Converter Control | Converter Control | |
| Ex. 1 DFC-TV | Converter Control | Converter Control | |
| Ex. 2 Yellow Base | 38 | Worst Case Calculation < SML | Migration test results from Sun Rochdale analytical proved this was below 0.01 mg/Kg food. |
| Ex. 2 Yellow Base | 0 | Worst Case Calculation < SML | |
| Ex. 2 Yellow Base | 20 | Worst Case Calculation < SML | Hazard Assessed—new SML 5 mg/Kg food |
| Ex. 2 Yellow Base | 1138 | Worst Case Calculation > SML—Converter Review | Hazard Assessed—new SML 0.09 mg/Kg food (Cramer Class III). Not detected in migration test results from Sun Chemical Rochdale |
| Ex. 2 Yellow Base | 379 | Worst Case Calculation > SML—Converter Review | Hazard Assessed—new SML 0.09 mg/Kg food (Cramer Class III). Not detected in migration test results from Sun Chemical Rochdale |
| Ex. 2 Yellow Base | 252 | Worst Case Calculation > SML—Converter Review | Hazard Assessed—new SML 0.09 mg/Kg food (Cramer Class III). Not detected in migration test results from Sun Chemical Rochdale |
| Ex. 2 Yellow Base | 3 | Worst Case Calculation < SML | Hazard Assessed—new SML 1.8 mg/Kg food (Cramer Class I) |
| Ex. 2 Yellow Base | 0 | Worst Case Calculation < SML | Hazard Assessed—new SML 1.8 mg/Kg food (Cramer Class I) |
| Ex. 2 Yellow Base | 0 | Worst Case Calculation < SML | Hazard Assessed—new SML 5 mg/Kg food |
| Ex. 2 Yellow Base | 1 | Worst Case Calculation < SML | Hazard Assessed—new SML 1.8 mg/Kg food (Cramer Class I) |
| Ex. 2 Yellow Base | 12 | Worst Case Calculation < SML | |
| Ex. 2 Yellow Base | 3 | Worst Case Calculation < SML | |
| Ex. 2 Yellow Base | 23 | Worst Case Calculation < SML | |
| Ex. 2 Yellow Base | 1 | Worst Case Calculation < SML | |
| Ex. 2 Yellow Base | 1 | Worst Case Calculation < SML | |

TABLE 13-continued

Migration Data (Table 11 Determinations for Children).

| | | | |
|---|---|---|---|
| Ex. 2 Yellow Base | 1 | Worst Case Calculation < SML | |
| Ex. 2 Yellow Base | Converter Control | Converter Control | |
| Ex. 2 Yellow Base | Converter Control | Converter Control | |
| Ex. 3 Orange Base | 41 | Worst Case Calculation < SML | Migration test results from Sun Rochdale analytical proved this was below 0.01 mg/Kg food. |
| Ex. 3 Orange Base | 0 | Worst Case Calculation < SML | |
| Ex. 3 Orange Base | 5 | Worst Case Calculation < SML | Hazard Assessed—new SML 0.09 mg/Kg food (Cramer Class III) |
| Ex. 3 Orange Base | 1 | Worst Case Calculation < SML | Hazard Assessed—new SML 0.09 mg/Kg food (Cramer Class III) |
| Ex. 3 Orange Base | 6 | Worst Case Calculation < SML | Hazard Assessed—new SML 0.09 mg/Kg food (Cramer Class III) |
| Ex. 3 Orange Base | 0 | Worst Case Calculation < SML | Hazard Assessed—new SML 0.09 mg/Kg food (Cramer Class III) |
| Ex. 3 Orange Base | 114 | | Not detected in migration test results from Sun Chemical Rochdale |
| Ex. 3 Orange Base | 0 | Worst Case Calculation < SML | Hazard Assessed—new SML 0.09 mg/Kg food (Cramer Class III) |
| Ex. 3 Orange Base | 0 | Worst Case Calculation < SML | Hazard Assessed—new SML 1.8 mg/Kg food (Cramer Class I) |
| Ex. 3 Orange Base | 4 | Worst Case Calculation < SML | Hazard Assessed—new SML 0.09 mg/Kg food (Cramer Class III) |
| Ex. 3 Orange Base | 4 | Worst Case Calculation < SML | Hazard Assessed—new SML 0.09 mg/Kg food (Cramer Class III) |
| Ex. 3 Orange Base | 2 | Worst Case Calculation < SML | |
| Ex. 3 Orange Base | Converter Control | Converter Control | |
| Ex. 3 Orange Base | Converter Control | Converter Control | |
| Ex. 4 Red Base | 33 | Worst Case Calculation < SML | Migration test results from Sun Rochdale analytical proved this was below 0.01 mg/Kg food. |
| Ex. 4 Red Base | 0 | Worst Case Calculation < SML | |
| Ex. 4 Red Base | 3 | Worst Case Calculation < SML | Hazard Assessed—new SML 0.09 mg/Kg food (Cramer Class III) |
| Ex. 4 Red Base | 5 | Worst Case Calculation < SML | Hazard Assessed—new SML 0.09 mg/Kg food (Cramer Class III) |
| Ex. 4 Red Base | 86 | Worst Case Calculation < SML | Hazard Assessed—new SML 0.09 mg/Kg food (Cramer Class III). Not detected in migration test results from Sun Chemical Rochdale |
| Ex. 4 Red Base | 0 | Worst Case Calculation < SML | Hazard Assessed—new SML 0.09 mg/Kg food (Cramer Class III) |
| Ex. 4 Red Base | 2 | Worst Case Calculation < SML | Hazard Assessed—new SML 0.09 mg/Kg food (Cramer Class III) |
| Ex. 4 Red Base | 0 | Worst Case Calculation < SML | Hazard Assessed—new SML 5 mg/Kg food |
| Ex. 4 Red Base | 155 | Worst Case Calculation > SML—Converter Review | Not detected in migration test results from Sun Chemical Rochdale |
| Ex. 4 Red Base | 1 | Worst Case Calculation < SML | Hazard Assessed—new SML 0.09 mg/Kg food (Cramer Class III) |
| Ex. 4 Red Base | 0 | Worst Case Calculation < SML | Hazard Assessed—new SML 0.54 mg/Kg food (Cramer Class II) |

TABLE 13-continued

Migration Data (Table 11 Determinations for Children).

| | | | |
|---|---|---|---|
| Ex. 4 Red Base | 0 | Worst Case Calculation < SML | Hazard Assessed—new SML 1.8 mg/Kg food (Cramer Class I) |
| Ex. 4 Red Base | 4 | Worst Case Calculation < SML | Hazard Assessed—new SML 0.09 mg/Kg food (Cramer Class III) |
| Ex. 4 Red Base | 4 | Worst Case Calculation < SML | Hazard Assessed—new SML 0.09 mg/Kg food (Cramer Class III) |
| Ex. 4 Red Base | 0 | Worst Case Calculation < SML | Hazard Assessed—new SML 1.8 mg/Kg food (Cramer Class I) |
| Ex. 4 Red Base | 1 | Worst Case Calculation < SML | |
| Ex. 4 Red Base | Converter Control | Converter Control | |
| Ex. 4 Red Base | Converter Control | Converter Control | |
| Ex. 5 Blue Base | 33 | Worst Case Calculation < SML | Migration test results from Sun Rochdale analytical proved this was below 0.01 mg/Kg food. |
| Ex. 5 Blue Base | 0 | Worst Case Calculation < SML | |
| Ex. 5 Blue Base | 0 | Worst Case Calculation < SML | Hazard Assessed—new SML 5 mg/Kg food |
| Ex. 5 Blue Base | 0 | Worst Case Calculation < SML | |
| Ex. 5 Blue Base | 0 | Worst Case Calculation < SML | Hazard Assessed—new SML 1.8 mg/Kg food (Cramer Class I) |
| Ex. 5 Blue Base | 1 | Worst Case Calculation < SML | Hazard Assessed—new SML 1.8 mg/Kg food (Cramer Class I) |
| Ex. 5 Blue Base | 0 | Worst Case Calculation < SML | Hazard Assessed—new SML 5 mg/Kg food |
| Ex. 5 Blue Base | 1 | Worst Case Calculation < SML | Hazard Assessed—new SML 1.8 mg/Kg food (Cramer Class I) |
| Ex. 5 Blue Base | 1 | Worst Case Calculation < SML | |
| Ex. 5 Blue Base | 1 | Worst Case Calculation < SML | |
| Ex. 5 Blue Base | 1 | Worst Case Calculation < SML | |
| Ex. 5 Blue Base | Converter Control | Converter Control | |
| Ex. 5 Blue Base | Converter Control | Converter Control | |
| Ex. 6 Violet Base | 33 | Worst Case Calculation < SML | Migration test results from Sun Rochdale analytical proved this was below 0.01 mg/Kg food. |
| Ex. 6 Violet Base | 2 | Worst Case Calculation < SML | |
| Ex. 6 Violet Base | 0 | Worst Case Calculation < SML | |
| Ex. 6 Violet Base | 1 | Worst Case Calculation < SML | Hazard Assessed—new SML 1.8 mg/Kg food (Cramer Class I) |
| Ex. 6 Violet Base | 0 | Worst Case Calculation < SML | Hazard Assessed—new SML 5 mg/Kg food |
| Ex. 6 Violet Base | 0 | Worst Case Calculation < SML | Hazard Assessed—new SML 0.09 mg/Kg food (Cramer Class III) |
| Ex. 6 Violet Base | 10 | Worst Case Calculation < SML | Hazard Assessed—new SML 0.00015 mg/Kg food |
| Ex. 6 Violet Base | 0 | Worst Case Calculation < SML | Hazard Assessed—new SML 1.8 mg/Kg food (Cramer Class I) |

TABLE 13-continued

Migration Data (Table 11 Determinations for Children).

| | | | |
|---|---|---|---|
| Ex. 6 Violet Base | 4 | Worst Case Calculation < SML | Hazard Assessed—new SML 0.09 mg/Kg food (Cramer Class III) |
| Ex. 6 Violet Base | 4 | Worst Case Calculation < SML | Hazard Assessed—new SML 0.09 mg/Kg food (Cramer Class III) |
| Ex. 6 Violet Base | 0 | Worst Case Calculation < SML | Hazard Assessed—new SML 1.8 mg/Kg food (Cramer Class I) |
| Ex. 6 Violet Base | 0 | Worst Case Calculation < SML | |
| Ex. 6 Violet Base | 0 | Worst Case Calculation < SML | |
| Ex. 6 Violet Base | 1 | Worst Case Calculation < SML | |
| Ex. 6 Violet Base | Converter Control | Converter Control | |
| Ex. 6 Violet Base | Converter Control | Converter Control | |
| Ex. 7 Black Base | 26 | Worst Case Calculation < SML | |
| Ex. 7 Black Base | 33 | Worst Case Calculation < SML | Migration test results from Sun Rochdale analytical proved this was below 0.01 mg/Kg food. |
| Ex. 7 Black Base | 0 | Worst Case Calculation < SML | |
| Ex. 7 Black Base | 0 | Worst Case Calculation < SML | Hazard Assessed—new SML 1.8 mg/Kg food (Cramer Class I) |
| Ex. 7 Black Base | 1 | Worst Case Calculation < SML | |
| Ex. 7 Black Base | Converter Control | Converter Control | |

[10]Maximum of material that could migrate based on 100% migration, paper straw scenario, adolescent 40.67 kg; [11]maximum of material that could migrate based on 100% migration, paper straw scenario, child 20.9 kg; [12]maximum of material that could migrate based on 100% migration, paper straw scenario, toddler 12.63 kg.

The following standard assumptions have been used in the preparation of tables 11, 12 and 13:
1) The standard exposure model of a 60 kg person consuming 1 kg of food in contact with 0.06 m$^2$ of printed substrate has been used unless and where stated the paper straw exposure scenario referenced in the application.
2) 100% coverage of the ink or varnish
3) Unless otherwise stated, the following coating weights have been assumed: inks and overprint varnish 2.0 g/m$^2$.
4) In order to ensure that the results equate to a worst-case calculation, 100% transfer of the potentially migratory substance to the foodstuff has been assumed.

For those evaluated substances with no specific restriction, a default migration limit of 60 mg/kg food has been used. For 'non-evaluated' substances, a hazard assessment has been done following EFSA principles, this is denoted by the abbreviation HA in the source of restriction column in Table 12.

As part of its own internal risk assessment process, Applicant has determined it will not disclose substances present at <1.0% of their specific migration limit (SML) based on the worst-case calculation criteria outlined above. This avoids the unnecessary disclosure of trace substances with no reasonable chance of affecting the status of the Sun Chemical product itself let alone the legal compliance of the finished food packaging, material or article.

Tables 11-13 above represent migration analysis based on worst case scenarios to show that the inks and method of the present invention would provide DFC safe inks under conditions that meet and even exceed regulatory restrictions. The following Tables 14-16 provide results of analytic testing for detectable materials in the inks described herein and further displays that the inks described herein and method meet or exceed DFC regulations for all detectable materials in the inks.

All results in Tables 14-16 were obtained using EU cube model (ppb, µg/kg).

Methodology for analytical data in Tables 14-16: The GC-MS (gas chromatography-mass spectrometry) analysis showed the migration of several ink-related components. Table 14 contains the analytes for which reference materials could be obtained. The levels of these components were calculated against a calibration curve and are presented in the table with their specific migration limits (SMLs) according the Swiss Ordinance. All results are given in ppb, µg/kg, EU Cube model.

The analytes for which no reference materials could be obtained are given in Table 15 with their library match % and SML. Library match % refers to the % likelihood that the detected material is the material as stated in the table when compared to known materials stored in an analytic library. A library match % above 70 represents a very strong likelihood that the material is the one stated in the chart or a very close equivalent. As can be seen in Table 15, the library match % for each material is >80. Each analyte has been estimated against the response of an internal standard.

All samples contained a number of peaks which could not be identified by the libraries used—the number of unidentified peaks in each sample has also been included in Table 15. These unidentified peaks were also seen in the acrylic emulsion material.

TABLE 14

Quantitative results of the GC-MS analysis of the samples provided (ppb, µg/kg, EU cube model)

| Analyte | CAS# | Ex. 13 Black | Ex. 9 Orange | Ex. 10 Red | Ex. 8 Yellow | Ex. 12 Violet | Ex. 11 Blue | Ex. 14 Pink | SML |
|---|---|---|---|---|---|---|---|---|---|
| 2-Ethyl-1-hexanol | 104-76-7 | 159[2] | 106[2] | 108[2] | 43 | 83[2] | 103[2] | 97[2] | 30000 |
| 2-Ethylhexyl acrylate | 103-11-7 | <10 | <10 | <10 | <10 | <10 | <10 | <10 | 50 |
| 1,3-Diacetylbenzene | 6781-42-6 | ND | ND | <10 | 297 | 20[2] | 51 | <10 | 1800[1] |
| Unidentified indanone | unknown | ND | ND | ND | <10 | ND | ND | ND | 10 |
| 2-hexyl-1-decanol | 2425-77-6 | ND | ND | ND | 19 | <10 | <10 | ND | 5000 |
| 2-Palmitoyglycerol | 23470-00-0 | ND | ND | ND | 8140[2] | 136[2] | 950[2] | ND | 60000[1] |
| Monostearin | 123-94-4 | ND | ND | ND | 13258[2] | 155[2] | 1275[2] | ND | 60000[1] |
| cis-13-Docosenoamide | 112-84-5 | ND | ND | 43 | 4794[2] | 286[2] | 638[2] | ND | 60000[1] |

ND—not detected; < denotes less than; [1]SML proposed by Sun Chemical Product Stewardship team; [2]Results fall outside the calibration range used, these results are estimations only, based on extrapolated data.

The peak initially identified as 3,3-Dimethyl-1-indanone was found to not he this exact material. The ion pattern of the peak detected is very similar to that seen in 3,3-Dimethyl-1-indanone suggesting that the actual material has a very similar chemical structure. The peak was quantified against the 3,3-Dimethyl-1-indanone calibration curve and has been labelled as "unidentified indanone" in Table 14.

References were also obtained for as many components, highlighted as potentially above their SML on the Statements of Compositions (SoCS) provided, as possible. Only 3 of these components were found to be soluble in 50% ethanol or 3% acetic acid—diethanolamine, diethanololeamide and 4-chlorobenzaldehyde. The other components obtained were not soluble in these food simulants so are therefore not considered to be a migration risk.

The components that were soluble in 50% ethanol were analysed by liquid chromatography-mass spectrometry (LC-MS) and the samples were reanalysed, looking specifically for these components.

The targeted LC-MS analysis of the straws showed the migration of diethanolamine and diethanololeamide from the Ex. 8 DFC Yellow samples—both at levels significantly below the SMLs given on the SoCS. These components were either not detected or detected at <1 ppb, µg/kg, EU Cube model in all other samples. 4-chlorobenzaldehyde was not detected in any of the samples provided (the limit of detection for this component was equivalent to 6 ppb µg/kg, EU Cube model).

The results of the LC-MS analysis have been given in Table 16. All results have been given in ppb, µg/kg, EU Cube model.

TABLE 15

Qualitative results of the GC-MS analysis of the samples provided

| Analyte | CAS# | Lib match % | Ex. 13 Black | Ex. 9 Orange | Ex. 10 Red | Ex. 8 Yellow | Ex. 12 Violet | Ex. 11 Blue | Ex. 14 Pink | SML |
|---|---|---|---|---|---|---|---|---|---|---|
| 2-Ethylhexyl acetate | 103-09-3 | 87 | <10 | <10 | <10 | <10 | <10 | <10 | <10 | 5000[1] |
| 2-Ethyl-1-decanol | 21078-65-9 | 87 | <10 | <10 | <10 | ND | <10 | <10 | <10 | 1800[1] |
| BHT | 128-37-0 | 100 | ND | <10 | <10 | ND | <10 | ND | <10 | 3000 |
| Oxalic acid, monoamide, N-allyl-, nonyl ester | unknown | 81 | ND | ND | ND | ND | ND | ND | ND | 10 |
| 1,2-diphertyl-cyc1obutane | 3018-21-1 | 82 | ND | <10 | <10 | ND | <10 | ND | ND | 90[1] |
| 1-Phenyl-1,2,3,4-tetrahydronaphthalene | 3018-20-0 | 84 | ND | <10 | <10 | ND | <10 | ND | ND | 90[1] |
| 3-(2,4,6-Cycloheptatrien-1-yl)-2,4-pentanedione | 65548-56-3 | 82 | ND | ND | ND | ND | ND | ND | ND | 10 |
| 2-hexyl-1-dodecanol | 110225-00-8 | 90 | ND | ND | ND | 13 | <10 | <10 | ND | 1800[1] |
| Unidentified amide | unknown | — | ND | ND | ND | 74 | <10 | <10 | ND | — |
| Butylbenzenesulfonamide | 3622-84-2 | 85 | ND | ND | ND | ND | ND | ND | ND | 10 |
| 1-Heneicosanol | 15594-90-8 | 86 | ND | ND | ND | ND | ND | ND | ND | 10 |

ND—not detected; < denotes less than; [1]SML proposed by Sun Chemical Product Stewardship team. The peak initially identified as Oleamide was found to not be this exact material. It has now been renamed as "unidentified amide" in Table 9.

TABLE 16

Results of the targeted LC-MS (liquid chromatography) analysis (ppb, µg/kg, EU Cube model)

| | Diethanolamine | Diethanololeamide |
|---|---|---|
| CAS# | 111-42-2 | 93-83-4 |
| SML from SoC | 300 | 5000 |
| Ex. 8 DFC Yellow | 7 | 320 |

Methodology:

Prints, 100 cm², were extracted into 20 ml of 50% ethanol for 6 hours at room temperature. After 6 hours, the prints were removed and a 1 ml aliquot was analysed by LC-MS (using the IM373 instrument parameters).

The remaining sample was liquid-liquid extracted into 40 ml DCM. The DCM was then evaporated to 1 ml and run on GC-MS (IM304 instrument parameters). The print samples were compared to the virgin substrate provided and only the ink-related peaks were identified.

The peaks identified were compared to an internal standard, ethyl-2-cyclohexanone acetate (CAS #24731-17-7), which was spiked in at 3.75 ppm.

Tables 14-16 show the substances that are in the direct food contact inks along with the safe limits of these substances and the worst-case migration value, if all of such substances were to migrate.

Taking the example of the paper straw scenario for direct contact food exposure, and for the range of the bodyweight examples provided in tables 12 and 13 that is, from an adult weighing 70.26 kg to a toddler weighing 12.63 kg, of the 91 substance and ink combinations listed, 76 of these are shown to be safe for direct food contact by the worst case calculation method; 14 substance/ink combinations have concentrations that are directly affected by the drying process and so have a basis for safety based on converter control, which as indicated is easily managed, and only one substance ink combination has a worst case migration limit above the specific migration limit. For this one substance migration testing was performed to demonstrate compliance.

For the 14 substance/ink combinations where converter control is the basis for safety the two substances are: water (CAS: 7732-18-5) and 2-propanol (CAS: 67-63-0).

The one substance/ink combination that could not be shown to be compliant by worst case calculation was 2,4,6 (1H,3H,5H)-Pyrimidinetrione, 5-(2,3-dihydro-3-oxo-1H-isoindol-1-ylidene)-(CAS: 13481-50-0), which present in the yellow color base.

Using the EU Cube exposure scenario (as opposed to the paper straw scenario), then again, of the 91 substance/ink combinations, there are the same 14 substance/ink combinations where converter control is the basis for safety, with water and 2-propanol being the substances in question. 67 substance/ink combinations are shown to be safe by worst case calculation and for 10 substance ink combinations migration testing is required.

These 10 substance/ink combinations are:

| Substance | CAS Number | Present in |
|---|---|---|
| Carnauba wax | 8015-86-9 | Wax additive |
| acrylic acid, 2-ethylhexyl ester | 103-11-7 | DFC-TV, Yellow Base and Orange Base |
| barbituric acid | 67-52-7 | Yellow Base |
| phthalimide | 85-41-6 | Yellow Base |
| benzonitrile, 4,4'-(6-methyl-2,4-pyrimidinediyl)bis- | 204588-97-6 | Orange Base |
| 4-Phenylbenzamide | 3815-20-1 | Red Base |
| 2,4,6-Tris-biphenyl-4-yl-7H-3-pyrrolo[2,d]pyrimidine-5-carboxylic acid | No CAS | Yellow Base |
| 2,4,6(1H,3H,5H)-Pyrimidinetrione, 5-(2,3-dihydro-3-oxo-1H-isoindol-1-ylidene)- | 13481-50-0 | Yellow Base |

These substance/ink combination were shown to be compliant as the substance was not detected above the Specific Migration Limits in migration testing.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A printing ink safe for direct food contact comprising:
a colorant selected from an organic colorant selected from isoindoline yellow, diketopyrrolo-pyrrole orange, diketopyrrolo-pyrrole red, quinacridone red, phthalocyanine blue, dioxazin violet,
and optionally an inorganic colorant selected from carbon black, titanium dioxide, and blends thereof,
0.1 to 4.0 wt % of a wax, and
a water-based acrylic emulsion safe for food contact,
wherein the ink is suitable for drying to form a film upon application on a substrate;
wherein the Chroma value (C) of the ink is 10% or greater than the Chroma value (C) of an ink colored by inorganic colorant of the same color; and
wherein the organic colorant, wax and chemical substances comprised by the ink are determined to be safe for contact with food by having migration values below safe migration limits as established in regulatory lists for human exposure or by following an EFSA based substance hazard assessment process, and wherein the ink exhibits resistance to removal when the inks are printed on a paper substrate, as indicated by a score of 4 or greater on one or more of the following tests: Immersion test; Bleed test; and SATRA dry rub resistance test.

2. The printing ink of claim 1, wherein the organic colorant is selected from Paliotol Yellow D1818, Irgazin Orange D2905, Irgazin Rubine L4025, Heliogen Blue D6840, Cromophtal Violet D5700, Suncroma C47-2222, and blends thereof.

3. The printing ink of claim 1, wherein the organic colorant is selected from a pigment corresponding to one of the following color indexes: Yellow 139, orange 71, red 264, red 122, blue 15:0, Violet 37, and the inorganic colorant is selected from black 7, white 6, and blends thereof.

4. The printing ink of claim 1, wherein the migration values for the organic colorant and chemical substances are equal to or below the threshold for a human of 60 kg in accordance with the EU Cube Model.

5. The printing ink of claim 1, wherein the migration values for the organic colorant and chemical substances are equal to or below the threshold for a human of 70.3 kg in accordance with the Paper Straw Scenario.

6. The printing ink of claim 1, wherein the migration values for the organic colorant and chemical substances are equal to or below the threshold for a human of 40.7 kg in accordance with the Paper Straw Scenario.

7. The printing ink of claim 1, wherein at least some of the chemical substances include additives selected from adhesion promoters, silicones, light stabilizers, de-gassing additives, ammonia, flow promoters, defoamers, antioxidants, stabilizers, surfactants, dispersants, plasticizers, rheological additives, silicones, and combinations thereof.

8. A set of printing inks that are safe for direct food contact, the inks of the set being of different colors and providing a wide color gamut and comprising at least one ink of claim 1, the inks of the set comprising organic colorants and optionally carbon black or titanium oxide, wherein the organic colorants and chemical substances comprised by the inks are determined to be safe for contact with food by having migration values below safe migration limits as established in regulatory lists for human exposure or by following an EFSA based substance hazard assessment process, and wherein the ink exhibits resistance to removal.

9. The set of printing inks of claim 8, wherein the ink set comprises red, yellow, orange, blue, violet, black, pink and clear colored inks.

10. The set of printing inks of claim 8 wherein the colorants are selected from Isoindoline yellow, diketopyrrolo-pyrrole orange, diketopyrrolo-pyrrole red, quinacridone red, phthalocyanine blue, dioxazin violet, carbon black, titanium dioxide, and blends thereof.

11. The set of printing inks of claim 8, wherein the migration values for the organic colorant and the chemical substances are equal to or below the threshold for a human of 60 kg in accordance with the EU Cube Model.

12. The set of printing inks of claim 8, wherein the migration values for the organic colorant and the chemical substances are equal to or below the threshold for a human of 70.3 kg in accordance with the Paper Straw Scenario.

13. The set of printing inks of claim 8, wherein the migration values for the organic colorant and the chemical substances are equal to or below the threshold for a human of 40.7 kg in accordance with the Paper Straw Scenario.

14. A printed article comprising a substrate and the printing inks of the set of claim 8.

15. The printed article of claim 14, wherein the article is suitable for direct contact with food.

16. The printed article of claim 14, wherein the substrate comprises paper, board, metallized paper, polyethylene, foil, metallized film, and polymeric films.

17. The printed article of claim 14, wherein the substrate comprises paper.

18. The printed article of claim 14, wherein the article is a paper drinking straw.

19. A method of preparing a printed substrate that is safe for direct contact with food, comprising:
   printing a substrate with one or more inks of claim 1; and
   drying the substrate.

* * * * *